United States Patent
Jung et al.

(10) Patent No.: US 12,457,007 B2
(45) Date of Patent: Oct. 28, 2025

(54) METHOD AND APPARATUS FOR CARRYING OUT ULTRA-WIDEBAND COMMUNICATION

(71) Applicant: Samsung Electronics Co., Ltd., Suwon-si (KR)

(72) Inventors: Sooyeon Jung, Suwon-si (KR); Mingyu Lee, Suwon-si (KR); Taeyoung Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 33 days.

(21) Appl. No.: 18/290,544

(22) PCT Filed: Jun. 14, 2021

(86) PCT No.: PCT/KR2021/007415
§ 371 (c)(1),
(2) Date: Nov. 14, 2023

(87) PCT Pub. No.: WO2022/265123
PCT Pub. Date: Dec. 22, 2022

(65) Prior Publication Data
US 2024/0259045 A1    Aug. 1, 2024

(51) Int. Cl.
*H04B 1/7163* (2011.01)
*H04W 72/0446* (2023.01)

(52) U.S. Cl.
CPC ...... *H04B 1/7163* (2013.01); *H04W 72/0446* (2013.01)

(58) Field of Classification Search
CPC .. H04B 1/7163; H04W 72/0446; H04W 4/80; H04W 4/023; H04W 4/029; H04W 12/06; H04W 4/02; H04W 12/08; H04W 12/63; G01S 13/765; G06Q 20/341
See application file for complete search history.

(56) References Cited

U.S. PATENT DOCUMENTS

| | | |
|---|---|---|
| 11,400,889 B2 * | 8/2022 | Parthasarathi ......... G01S 11/04 |
| 2002/0018458 A1 | 2/2002 | Aiello et al. |
| 2005/0184165 A1 | 8/2005 | De Jong |

(Continued)

FOREIGN PATENT DOCUMENTS

| | | |
|---|---|---|
| KR | 10-2019-0000691 A | 1/2019 |
| KR | 10-2019-0030932 A | 3/2019 |

(Continued)

OTHER PUBLICATIONS

International Search Report dated Mar. 4, 2022, issued in International Patent Application No. PCT/KR2021/007415.

(Continued)

*Primary Examiner* — Sophia Vlahos
(74) *Attorney, Agent, or Firm* — Jefferson IP Law, LLP

(57) ABSTRACT

A first electronic device according to various embodiments of the present disclosure may: determine a location of the first electronic device via an out of band (OOB) connection; select, on the basis of information regarding the determined location, an applet within the first electronic device; and carry out, by using the selected applet, ultra-wideband (UWB) communication with a second electronic device adjacent to the determined location.

12 Claims, 25 Drawing Sheets

(56) References Cited

U.S. PATENT DOCUMENTS

| | | | |
|---|---|---|---|
| 2012/0158467 A1* | 6/2012 | Hammad | G06Q 20/3278 |
| | | | 455/39 |
| 2013/0128770 A1* | 5/2013 | Hansen | H04W 4/80 |
| | | | 370/254 |
| 2019/0090308 A1 | 3/2019 | Shin et al. | |
| 2019/0098018 A1 | 3/2019 | Lerch et al. | |
| 2020/0082370 A1* | 3/2020 | Yang | G06Q 20/20 |
| 2020/0106877 A1* | 4/2020 | Ledvina | H04L 63/0869 |
| 2020/0128401 A1 | 4/2020 | Shin et al. | |
| 2020/0302421 A1* | 9/2020 | Stickels | H04W 4/021 |
| 2021/0072373 A1 | 3/2021 | Schoenberg et al. | |
| 2021/0136543 A1 | 5/2021 | Hannestad et al. | |
| 2021/0373831 A1* | 12/2021 | Yu | G06F 3/1232 |

FOREIGN PATENT DOCUMENTS

| | | |
|---|---|---|
| KR | 10-2020-0028820 A | 3/2020 |
| KR | 10-2020-0028827 A | 3/2020 |
| WO | 2021-064102 A1 | 4/2021 |
| WO | 2021-089195 A1 | 5/2021 |

OTHER PUBLICATIONS

Extended European Search Report dated May 29, 2024, issued in European Patent Application No. 21946134.0-1218.

* cited by examiner (a)

(b)

METHOD AND APPARATUS FOR CARRYING OUT ULTRA-WIDEBAND COMMUNICATION

CROSS-REFERENCE TO RELATED APPLICATION(S)

This application is a U.S. National Stage application under 35 U.S.C. § 371 of an International application number PCT/KR2021/007415, filed on Jun. 14, 2021, the disclosure of which is incorporated by reference herein in its entirety.

BACKGROUND

1. Field

Various embodiments of the disclosure relate to a method and a device for performing ultra-wideband (UWB) communication.

2. Description of Related Art

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology and various industrial applications.

With the advance of wireless communication systems, various services can be provided, and accordingly there is a need for ways to effectively provide these services. For example, ranging technology may be employed to measure the distance between electronic devices by using UWB communication. The UWB communication is wireless communication technology using a very wide frequency band of several GHz or greater in a baseband without using a radio carrier.

SUMMARY

UWB may operate, based on very precise spatial recognition and directionality, to enable mobile devices to better perceive surroundings thereof. In addition, the use of UWB in mobile devices is expanding so that users may use, via mobile devices, a digital car key, door lock/gate key, near-field payment, and/or the like.

In particular, social interest has recently increased in contactless (tagless) gates, where fares are automatically paid when a user carrying a mobile device passes through a station ticket gate. Accordingly, there is a great demand for measures to further increase efficiency of UWB communication.

Various embodiments of the disclosure provide a method and a device for performing UWB communication.

In addition, various embodiments of the disclosure provide a method and a device capable of reducing a service processing time by increasing UWB communication efficiency.

A method according to various embodiments of the disclosure, particularly, a method of a first electronic device for performing ultra-wideband (UWB) communication includes: determining a location of the first electronic device via an out-of-band (OOB) connection; selecting an applet in the first electronic device, based on information on the determined location; and performing UWB communication with a second electronic device adjacent to the determined location by using the selected applet.

A device according to various embodiments of the disclosure, particularly, a first electronic device includes: a first communication unit configured to perform ultra-wideband (UWB) communication; a second communication unit configured to perform out-of-band (OOB) connection; and a controller configured to determine a location of the first electronic device via the OOB connection, select an applet in the first electronic device, based on information on the determined location, and control the first communication unit to perform the UWB communication with a second electronic device adjacent to the determined location by using the selected applet.

According to various embodiments of the disclosure, a data transmission and reception time via UWB communication can be reduced while minimizing changes in configurations (e.g., secure component and applet) of an existing electronic device.

According to various embodiments of the disclosure, service processing efficiency can be increased by reducing a data transmission and reception time via UWB communication.

DETAILED DESCRIPTION

Figure 1:
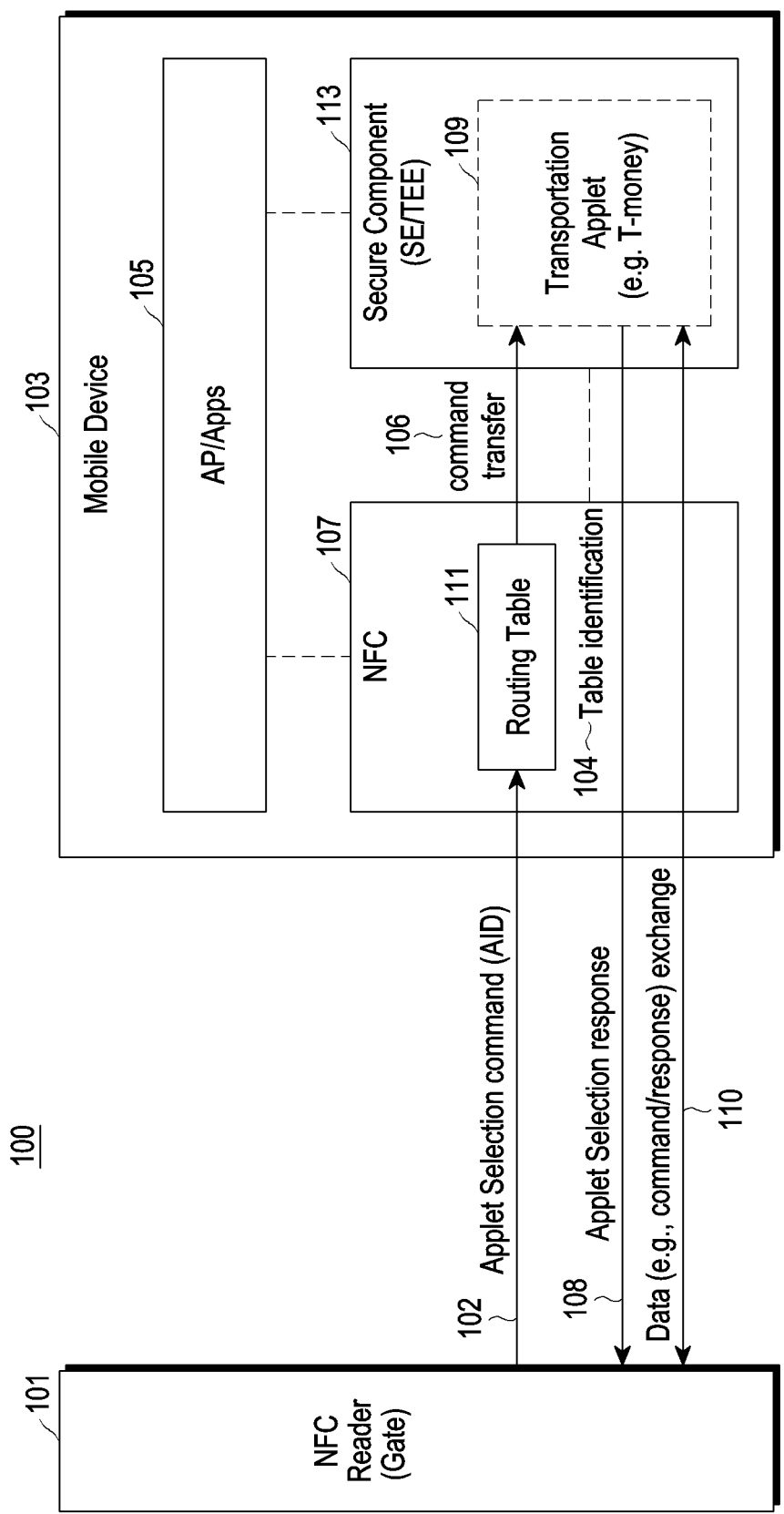
FIG. 1 is a diagram illustrating an exemplary configuration of a communication system for performing contactless communication based on NFC.

Hereinafter, embodiments of the disclosure will be described in detail with reference to the accompanying drawings.

In describing the embodiments, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Furthermore, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in the embodiments, the term "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Furthermore, the "unit" in the embodiments may include one or more processors.

As used in the specification, the term "mobile device" may also be referred to as the term "mobile station (MS)", "user equipment (UE)", "user terminal (UT)", "wireless terminal", "access terminal (AT)", "subscriber station (SS)", "wireless device", "wireless communication device", "wireless transmit/receive unit (WTRU)", "mobile node", "mobile", or other terms. Various examples of the "mobile device" may include a cellular phone, a smartphone having a wireless communication function, a personal digital assistant (PDA) having a wireless communication function, a wireless modem, a portable computer having a wireless communication function, an image capture device having a wireless communication function, such as a digital camera, a gaming device having a wireless communication function, a music storage and reproduction home appliance having a wireless communication function, a home appliance capable of wireless Internet access and browsing, and handheld units or terminals having theses function integrated therewith. In addition, the "mobile device" may, include, but limited thereto, a machine to machine (M2M) terminal and a machine type communication (MTC) terminal/device. In the specification, the "mobile device" may also be called an "electronic device" or simply called a "device".

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Hereinafter, embodiments of the disclosure will be described in detail in conjunction with the accompanying drawings. In the following description of embodiments of the disclosure, a communication system using a UWB will be described by way of example, but the embodiments of the disclosure may be applied to other communication systems having similar backgrounds or characteristics. Examples of such communication systems may include communication systems using Bluetooth or ZigBee. Therefore, based on determinations by those skilled in the art, the embodiments of the disclosure may be applied to other communication systems through some modifications without significantly departing from the scope of the disclosure.

Furthermore, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In general, wireless sensor network technologies may be largely divided into a wireless local area network (WLAN) technology and a wireless personal area network (WPAN) technology depending on a recognition distance. Here, the WLAN technology is a technology based on IEEE 802.11, and is a technology enabling access to a backbone network within a radius of about 100 m. In addition, the WPAN technology is a technology based on IEEE 802.15, and may include near-field communication (NFC), UWB, Bluetooth, and ZigBee. A wireless network in which such wireless network technologies are implemented may include multiple electronic devices and may support contactless (tagless) communication.

Contactless communication may be performed based on, for example, NFC or UWB, and general contactless communication operations related thereto will be described with reference to FIG. 1 to FIG. 4.

FIG. 1 is a diagram illustrating an exemplary configuration of a communication system for performing contactless communication based on NFC.

Referring to FIG. 1, a communication system 100 may include a first electronic device 101 and a second electronic device 103. In an embodiment, the first electronic device 101 may be, for example, a gate, and the second electronic device 103 may be, for example, a mobile device. Hereinafter, the first electronic device 101 is referred to as the gate 101 and the second electronic device 103 is referred to as the mobile device 103.

The gate 101 and the mobile device 103 may perform contactless communication based on NFC. To this end, the gate 101 may perform an operation as an NFC reader, and the mobile device 103 may include an application processor (AP) 105 configured to control driving of one or more applications, an NFC component 107, and a secure component 109, such as an secure element (SE) or a trusted execution environment (TEE).

When the presence of the mobile device 103 within a configured distance for NFC communication is recognized, the gate 101 may transmit, in operation 102, an applet selection command including an applet identifier (AID) to the mobile device 103. The NFC component 107 of the mobile device 103 may receive the applet selection command and detect the AID included in the applet selection command. In operation 104, the NFC component 107 may identify a routing table 111 to acquire applet information corresponding to the detected AID. The routing table 111 may include applet information (e.g., a location of an applet in the mobile device 103 (information on whether the applet is included in the AP 105 or included in the secure component 109)) corresponding to each AID, and may be included in the NFC component 107.

The NFC component 107 may identify an applet to which the applet selection command is to be transferred, based on the applet information identified from the routing table 111. For example, when a transportation applet (e.g., T-money) 113 included in the secure component 109 is identified as the applet to which the applet selection command is to be transferred, the NFC component 107 may transfer the applet selection command to the transportation applet 113, in operation 106.

In operation 108, the transportation applet 113 may transmit, to the gate 101, an applet selection response as a response to the applet selection command. The gate 101 may determine, based on the applet selection response, that the transportation applet 113 has been selected, and may exchange data with the transportation applet 113 in operation 110. The data may be exchanged between the gate 101 and the transportation applet 113 in the form of "APDU command" and "APDU response".

Figure 2:
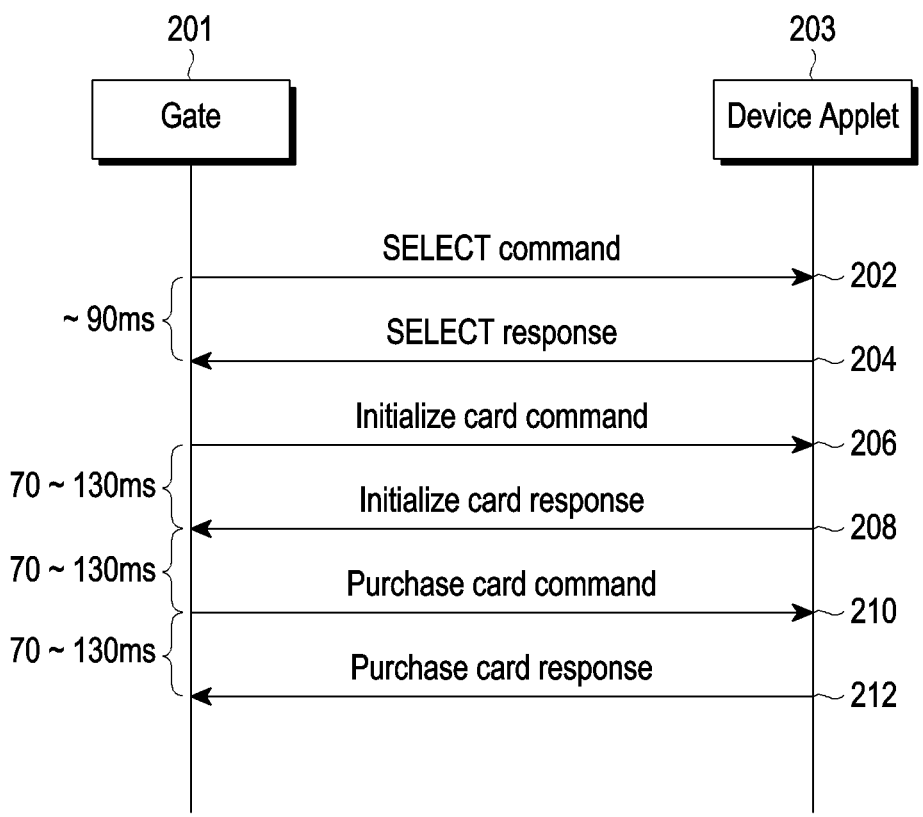
FIG. 2 is a signal flowchart illustrating an operation of performing contactless communication based on NFC.

FIG. 2 is a signal flowchart illustrating an operation of performing contactless communication based on NFC.

In FIG. 2, a gate 201 and a device applet 203 may correspond to the gate 101 and the transportation applet 113 in FIG. 1, respectively. The gate 201 may operate as an NFC reader, and the device applet 203 may communicate with the gate 201 via an NFC component.

Referring to FIG. 2, in operation 202, the gate 201 may transmit a SELECT command to the device applet 203. The SELECT command is a command for selecting the device applet 203, and may correspond to, for example, the applet selection command in FIG. 1.

In operation 204, the device applet 203 may transmit a SELECT response to the gate 201 in response to reception of the SELECT command.

In operation 206, the gate 201 may transmit an initialize card command to the device applet 203. The initialize card command may include information of an amount to be paid by the device applet 203, and the like.

In operation 208, the device applet 203 may transmit an initialize card response to the gate 201 in response to the initialize card command. The initialize card response may include authentication information for payment and balance information stored in the device applet 203, and the like. The gate 201 may determine, based on the initialize card response, whether payment is possible by the device applet 203.

In operation 210, when it is determined that payment is possible by the device applet 203, the gate 201 may transmit a purchase card command to the device applet 203. The purchase card command may include, for example, information indicating to make a payment.

In operation 212, in response to the purchase card command, the device applet 203 may identify whether the gate 201 is a valid gate for payment, deduct an amount indicated by the purchase card command, and then transmit a purchase card response including final balance information to the gate 201.

As illustrated in FIG. 2, in order for actual data transmission and reception to be performed between the gate 201 and the device applet 203, the device applet 203 needs to be selected by the gate 201. That is, the gate 201 needs to generate a communication channel with respect to the device applet 203 via applet selection, such as operations 202 and 204, and then perform operations through the generated communication channel based on a transportation protocol, i.e., command/response transmission and reception for payment initiation and processing, such as operations 206 and 208.

Applet selection as illustrated in operations 202 and 204 may take approximately 90 ms, and payment initiation as shown in operations 206 and 208 may take approximately 70 to 130 ms. In addition, payment processing as shown in operations 210 and 212 may take approximately 70 to 130 ms. The time required for each operation may vary depending on processing performance, implementation, and optimization of the secure component. However, in consideration of the approximate required time above, processing of approximately 1.2 persons per second may be possible when the gate 201 is crowded.

Next, an operation of performing contactless communication based on UWB will be described.

In an embodiment, the gate and the mobile device may perform communication based on UWB. For UWB communication, the gate and the mobile device may perform UWB ranging, wherein structures of rounds and ranging blocks used for the UWB ranging are as illustrated in FIG. 3.

Figure 3:
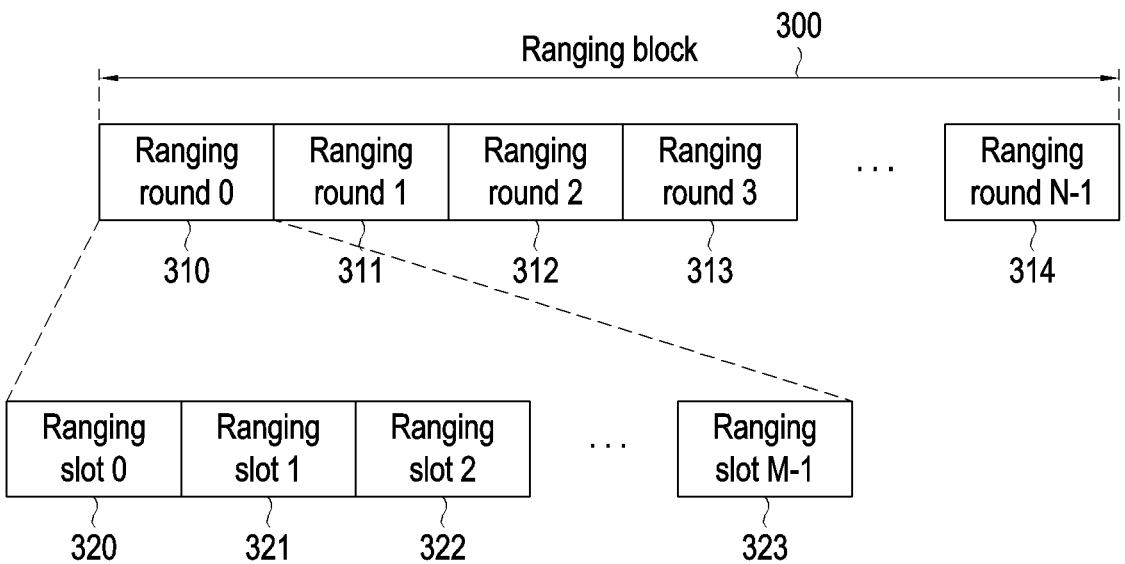
FIG. 3 shows diagrams illustrating structures of rounds and ranging blocks used for UWB ranging.
Figure 3:
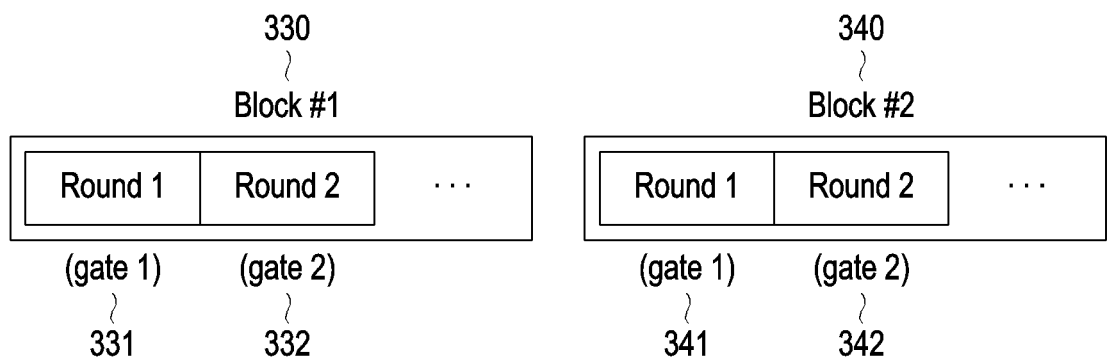

FIG. 3 shows diagrams illustrating structures of rounds and ranging blocks used for UWB ranging.

Referring to (a) of FIG. 3, a ranging block 300 may refer to a time period for ranging. A ranging round may be a period of sufficient duration to complete one entire ranging-measurement cycle involving a set of UWB devices participating in a ranging exchange. A ranging slot may be a sufficient period for transmission of at least one ranging frame (RFRAME) (e.g., a ranging initiation/response/final message, etc.).

As shown in (a) of FIG. 3, one ranging block 300 may include one or more ranging rounds (e.g., ranging round 0 310, ranging round 1 311, ranging round 2 312, ranging round 3 313, . . . , ranging round N−1 314 (N>3)), and each ranging round may include one or more ranging slots (e.g., ranging slot 0 320, ranging slot 1 321, ranging slot 2 322, . . . , ranging slot M−1 323 (M>2)).

When a ranging mode is a block-based mode, a mean time between successive ranging rounds may be constant. Alternatively, when the ranging mode is an interval-based mode, the time between successive ranging rounds may be changed dynamically. That is, the interval-based mode may adopt a time structure having adaptive spacing.

The number and duration of slots included in a ranging round may change between ranging rounds. This may be configured via a control message from a controller.

One gate and one mobile device may perform communication by occupying a specific ranging round of each ranging block. When a processing time (e.g., processing time>70 ms) required for data exchange (e.g., command/response transmission and reception) between one gate and one mobile device is considered, one piece of data (e.g., APDU) may be transmitted per ranging block.

For example, referring to (b) of FIG. 3, a first gate (gate 1) and a first mobile device may perform communication by occupying a first ranging round (round 1) 331 of a first ranging block (block #1) 330 and a first ranging round (round 1) 341 of a second ranging block (block #2) 340. In addition, a second gate (gate 2) and a second mobile device may perform communication by occupying a second ranging round (round 2) 332 of the first ranging block (block #1) 330 and a second ranging round (round 2) 342 of the second ranging block (block #2) 340.

Figure 4:
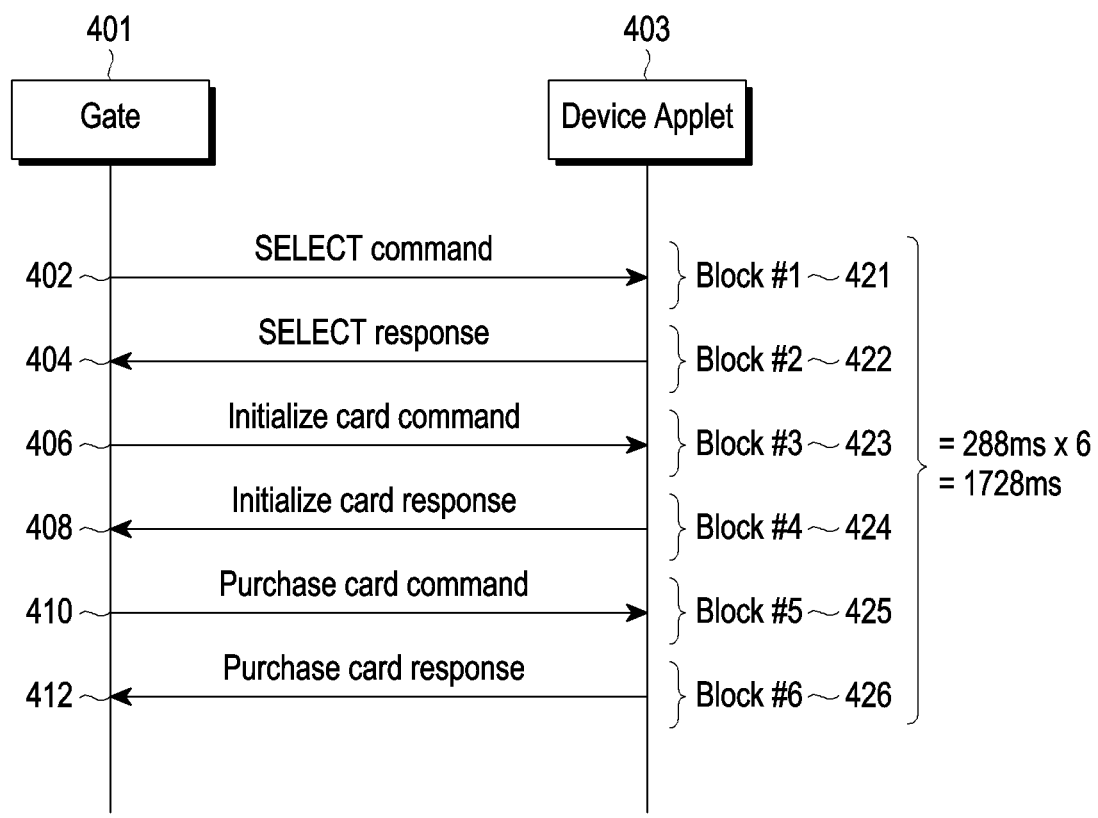
FIG. 4 is a signal flowchart illustrating an operation of performing contactless communication based on UWB.

For payment based on a transportation card protocol in Korea, exchange of at least 6 APDUs as shown in FIG. 4 is required.

FIG. 4 is a signal flowchart illustrating an operation of performing contactless communication based on UWB.

Operations of a gate 401 and a device applet 403 illustrated in FIG. 4 are similar to those of the gate 201 and the device applet 203 in FIG. 2, except that a communication scheme used is UWB.

Referring to FIG. 4, in operation 402, the gate 401 may transmit a SELECT command to the device applet 403. The SELECT command may be a command for selecting the device applet 403.

In operation 404, the device applet 403 may transmit a SELECT response to the gate 401 in response to reception of the SELECT command.

In operation 406, the gate 401 may transmit an initialize card command to the device applet 403. The initialize card command may include information of an amount to be paid by the device applet 403, and the like.

In operation 408, the device applet 403 may transmit an initialize card response to the gate 401 in response to the initialize card command. The initialize card response may include authentication information for payment and balance information stored in the device applet 403, and the like. The gate 401 may determine, based on the initialize card response, whether payment is possible by the device applet 403.

In operation 410, when it is determined that payment is possible by the device applet 403, the gate 401 may transmit a purchase card command to the device applet 403. The purchase card command may include, for example, information indicating to make a payment.

In operation 412, the device applet 403 may transmit a purchase card response to the gate 401 in response to the purchase card command. The purchase card response may include, for example, information for payment.

In a UWB communication environment, if a size of one ranging round is 24 ms and the number of ranging rounds included in one ranging block is 12, a size of one ranging block may be 288 ms. In addition, operations 402, 404, 406, 408, 410, and 412 may be performed during ranging rounds of a first ranging block (block #1) 421, a second ranging block (block #2) 422, a third ranging block (block #3) 423, a fourth ranging block (block #4) 424, a fifth ranging block (block #5) 425, a sixth ranging block (block #6) 426, respectively.

When the above description is considered, a time of 1728 ms (=288 ms×6) may be required to exchange 6 APDUs as shown in operations 402 to 412. As a result, when a transportation card payment is performed based on UWB, it may take 1.728 s per person (per mobile device). The time of 1.728 s shows a significantly longer time compared to a time required when another communication technology, such as NFC, is used. Therefore, a method to further increase time efficiency for a UWB-based contactless communication method is needed.

Various embodiments of the disclosure provide a method and a device capable of increasing time efficiency for UWB communication.

Specific terms used in the following description are provided to aid understanding of various embodiments the disclosure, and the use of these specific terms may be changed to other forms without departing from the technical spirit of the disclosure.

"Application protocol data unit (APDU)" may be a command and a response used when communicating with an application data structure within a UWB device.

"Applet" may be an applet running on a secure component including UWB parameters and service data. In various embodiments of the disclosure, an applet may be a FiRa applet defined by FiRa.

"Ranging device" may be a ranging device (RDEV) or an enhanced ranging device (ERDEV) defined in IEEE Std 802.15.4/4z. In various embodiments of the disclosure, a ranging device may be a FiRa device defined by FiRa. A ranging device may be referred to as a UWB device.

"UWB-enabled application" may be an application using a framework API for configuring a UWB service, a secure service, and/or an out-of-band (OOB) connector for a UWB session. In various embodiments of the disclosure, "UWB-enabled application" may be abbreviated as application or a UWB application. A UWB-enabled application may be a FiRa-enabled application defined by FiRa.

"Framework" may be a collection of logical software components including a UWB Service, a secure service, and/or an OOB connector. In various embodiments of the disclosure, a framework may be a FiRa framework defined by FiRa.

"OOB connector" may be a software component for establishing an OOB connection (e.g., BLE connection) between ranging devices. In various embodiments of the disclosure, an OOB connector may be a FiRa OOB connector defined by FiRa.

"Service" may be implementation of a use case in which a service is provided to an end-user.

"Smart ranging device" may be a ranging device which may implement an optional framework API. In various embodiments of the disclosure, a smart ranging device may be a FiRa smart device defined by FiRa.

"Framework API" may be an API used by a UWB-enabled application to communicate with a framework.

"Out-of-band (OOB)" is an underlying radio technology and may be data communication that does not use UWB.

"Secure component" may be, for example, an entity having a defined security level, which interfaces with a UWBS for the purpose of providing an RDS to the UWBS when a dynamic STS is used.

"Secure element (SE)" may be a tamper-resistant secure hardware component which may be used as a secure component in a ranging device.

"Secure service" may be a software component for interfacing with a secure component, such as a secure element or a trusted execution environment (TEE).

"Service applet" may be an applet on a secure component handling a service-specific transaction.

"Service data" may be data defined by a service provider, which needs to be transferred between two ranging devices for service implementation.

"Secure ranging" may be ranging based on an STS generated via a strong encryption operation.

"UWB service" may be a software component for providing access to the UWBS.

"UWB subsystem (UWBS)" may be a hardware component for implementing UWB PHY and MAC specs. The UWBS may have an interface for a framework and an interface for a secure component for a search for an RDS. In various embodiments of the disclosure, UWB PHY and MAC specs may be FiRa PHY and FiRa MAC specs defined by FiRa referring to IEEE 802.15.4/4z.

Figure 5:
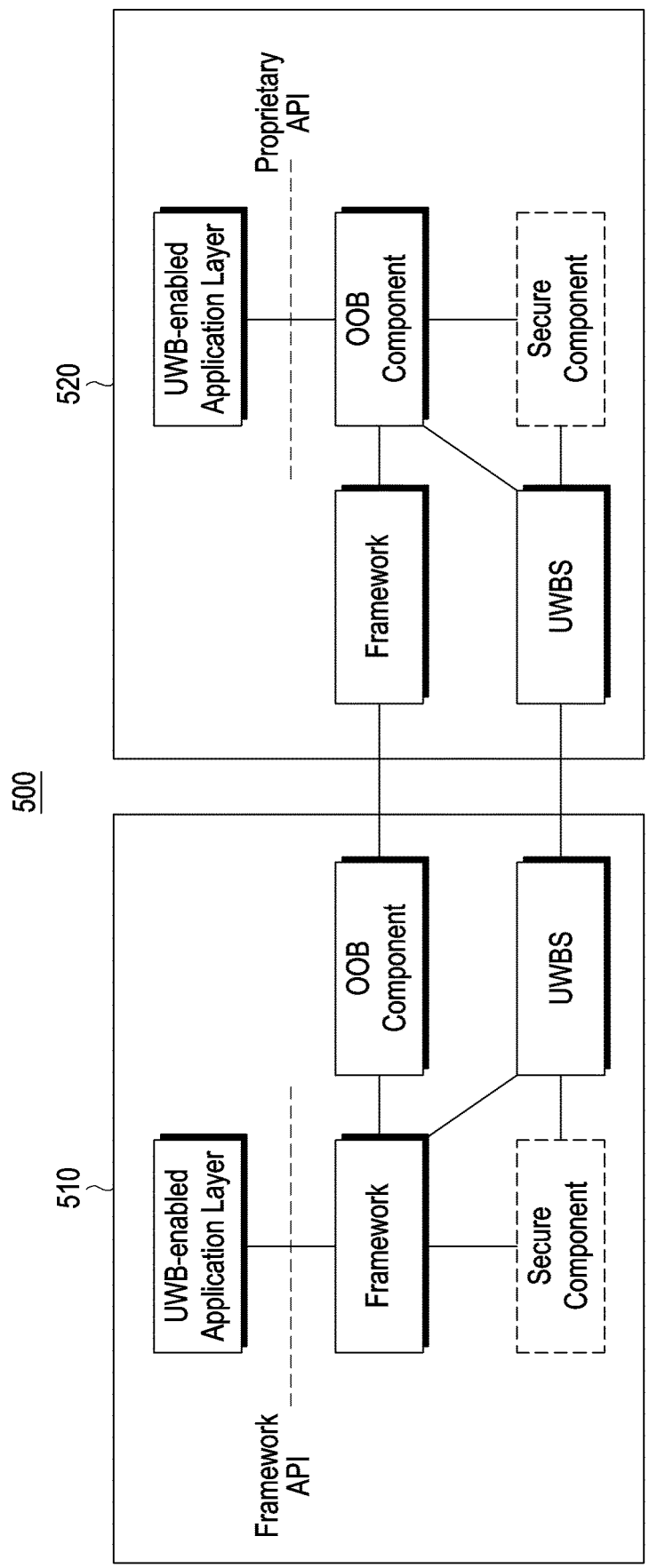
FIG. 5 is a diagram illustrating an exemplary configuration of the communication system including UWB devices according to various embodiments of the disclosure.

FIG. 5 is a diagram illustrating an exemplary configuration of the communication system including UWB devices according to various embodiments of the disclosure.

Referring to FIG. 5, a communication system 500 may include a first UWB device 510 and a second UWB device 520. In an embodiment, the first UWB device 510 may be, for example, a smart ranging device, and the second UWB device 520 may be, for example, a ranging device. Both the first UWB device 510 and the second UWB device 520 may support UWB ranging (e.g., UWB secure ranging).

The first UWB device 510 may, for example, host one or more UWB-enabled applications which may be installed by a user (e.g., a mobile device). This may be based on a framework API. The second UWB device 520 does not provide a framework API, and may use, for example, a proprietary interface to implement a specific UWB-enabled application provided only by a manufacturer.

Unlike what is illustrated, depending on an embodiment, both the first UWB device 510 and the second UWB device 520 may be smart ranging devices, or both the first UWB device 510 and the second UWB device 520 may be ranging devices.

The first UWB device 510 and the second UWB device 520 may include a UWB-enabled application layer, a framework, an OOB component, a secure component, and/or a UWBS. The framework API, the framework, the OOB component, and/or the secure component may be included in the framework, and some components may be omitted depending on an embodiment. For description of each element, aforementioned contents may be referred to.

The first UWB device 510 and the second UWB device 520 may generate an OOB connection (channel) by using the OOB component (e.g., a BLE component) and may exchange parameters for establishment of a UWB session via the OOB channel.

In addition, the first UWB device 510 and the second UWB device 520 may perform UWB ranging and service data transaction via a UWB session established via the UWBS by using the parameters exchanged with each other.

In various embodiments of the disclosure, the OOB component may be referred to as an OOB subsystem.

In various embodiments of the disclosure, the UWB-enabled application layer and/or framework may be implemented by an AP (or processor). Accordingly, in various embodiments of the disclosure, operations of the UWB-enabled application layer and/or framework may be understood as being performed by an AP.

Figure 6:
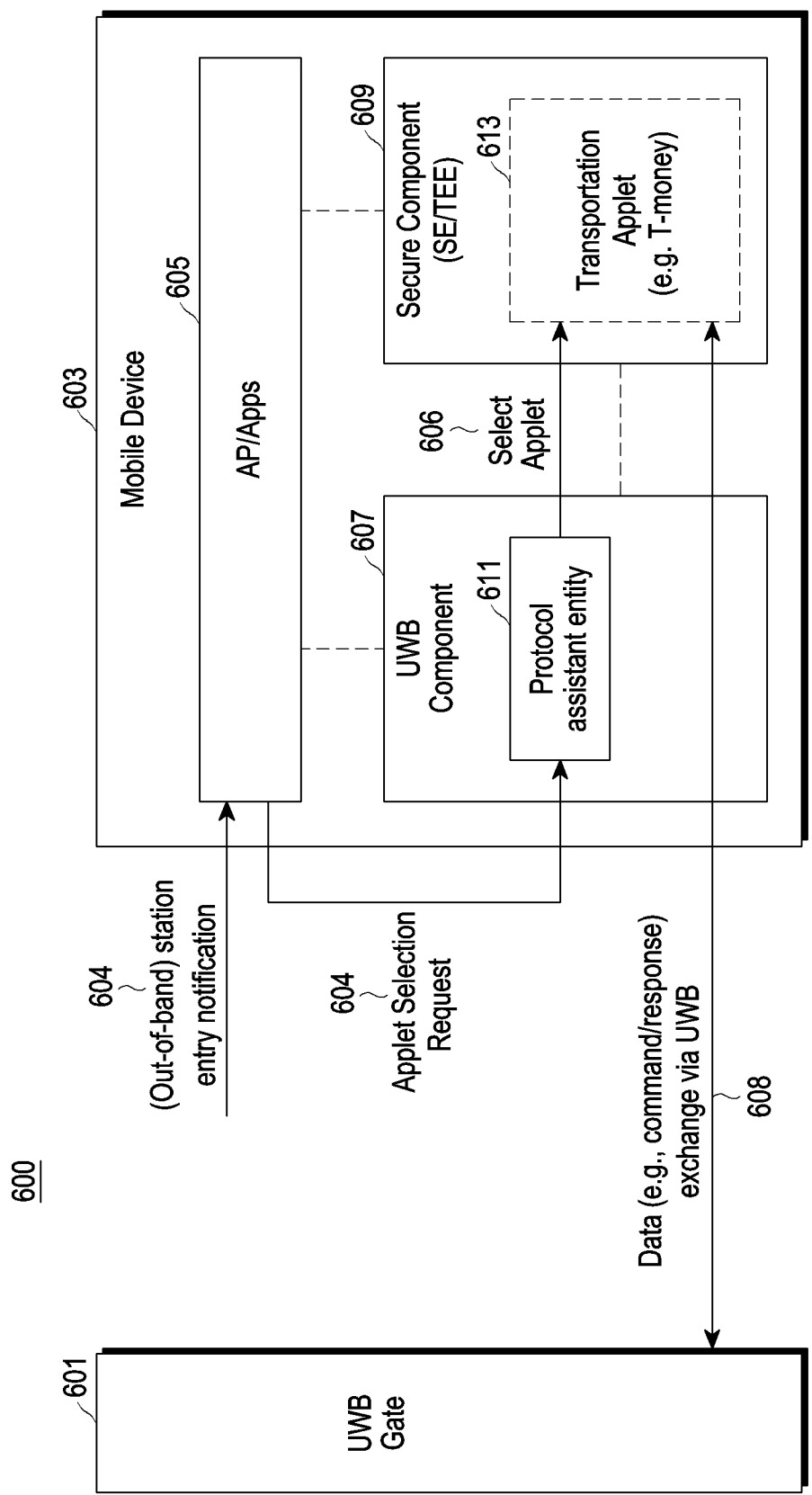
FIG. 6 is a diagram illustrating an exemplary configuration of the communication system including UWB devices within a station according to various embodiments of the disclosure.

FIG. 6 is a diagram illustrating an exemplary configuration of the communication system including UWB devices within a station according to various embodiments of the disclosure.

Referring to FIG. 6, a communication system 600 may include a first UWB device 601 and a second UWB device 603. In an embodiment, the first UWB device 601 may be, for example, a gate, and the second UWB device 603 may be, for example, a mobile device. Hereinafter, the first UWB device 601 is referred to as the gate 601 and the second UWB device 603 is referred to as the mobile device 603. However, electronic devices according to various embodiments of the disclosure may not be limited to only a gate and a mobile device, and may be various electronic devices capable of performing UWB communication, such as a vehicle and a mobile device, a mobile device and another mobile device, etc.

In an embodiment, the gate 601 may perform an open operation when payment or authentication for the mobile device 603 is completed based on UWB communication. In an embodiment, the gate 601 may be referred to as a UWB gate and may represent a ticket gate in a station (e.g., a train or subway station).

The mobile device 603 may include an AP (or application or framework) 605 which controls driving of one or more applications, a UWB component 607 for UWB communication, and a secure component 609, such as a secure element (SE) or a trusted execution environment (TEE).

In operation 602, the AP 605 may receive, from an OOB component, a notification that the mobile device has entered a station. Although not illustrated in FIG. 6, the OOB component may be included in the mobile device 603. In an embodiment, the OOB component may generate a notification that the mobile device has entered a station, and transfer the notification to the AP 605 via OOB-based communication (e.g., Bluetooth).

In operation 604, the AP 605 may transmit an applet selection request to the UWB component 607, based on the station entry notification. In an embodiment, the applet selection request may be received by a protocol assistant entity 611 included in the UWB component 607. The protocol assistant entity 611 may be, for example, software capable of performing applet selection.

In operation 606, the protocol assistant entity 611 may perform applet selection based on the applet selection request. In an embodiment, if the applet selection request includes information related to the station entry notification, the protocol assistant entity 611 may select a transportation applet 613 (e.g., T-money) as an applet corresponding to the information.

In operation 608, the transportation applet 613 may be activated by selection of the protocol assistant entity 611 so as to perform data (e.g., command/response) exchange with the gate 601 via UWB. The data exchange may be performed between the gate 601 and the transportation applet 613 in the form of "APDU command" and "APDU response".

The transportation applet 613 may be included in the secure component 609 as illustrated in FIG. 6, but may also be included in the AP 605. In this case, the applet selection may be performed by the AP 605 instead of the protocol assistant entity 611. For example, when the station entry notification is received, the AP 605 may directly select the transportation applet 613 included in the AP 605, based on the station entry notification.

Figure 7:
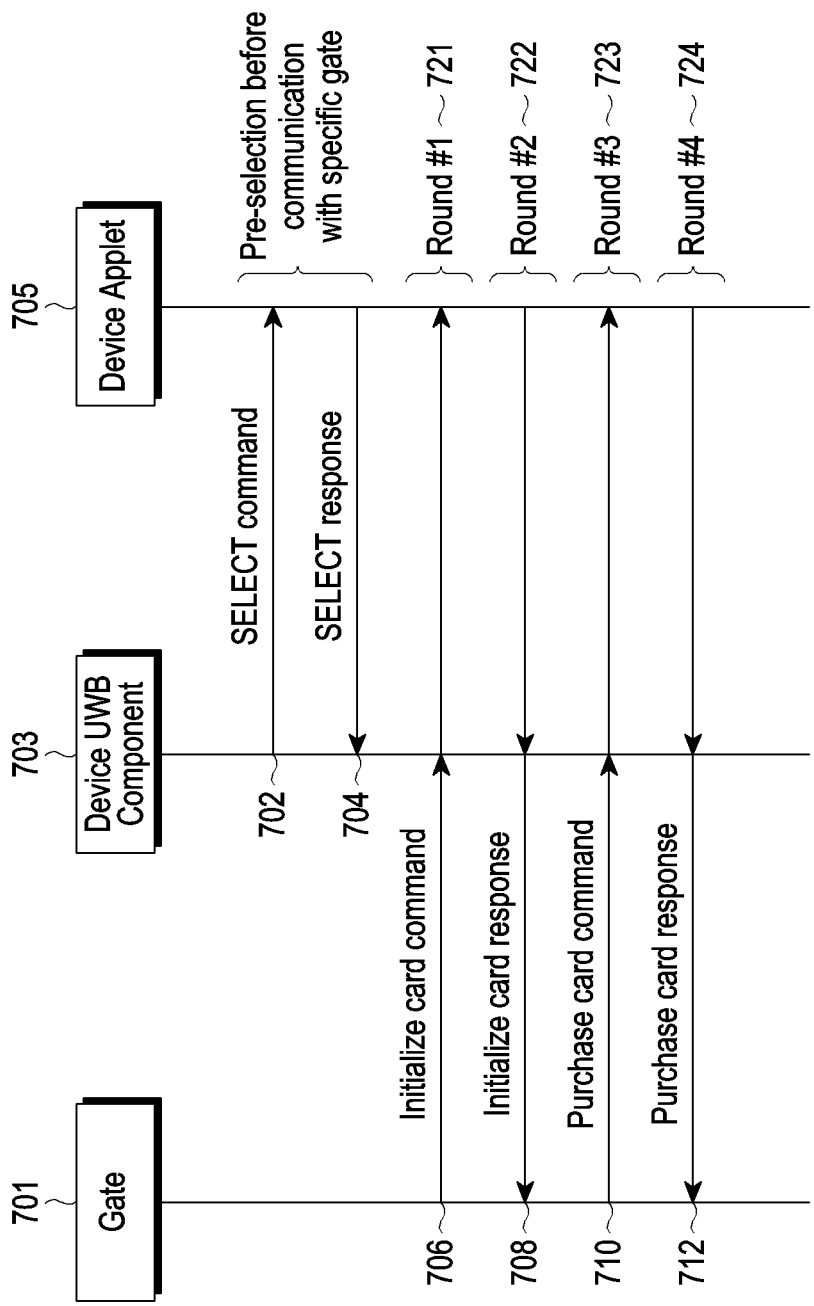
FIG. 7 is a signal flowchart illustrating a UWB communication operation based on applet pre-selection according to various embodiments of the disclosure.

FIG. 7 is a signal flowchart illustrating a UWB communication operation based on applet pre-selection according to various embodiments of the disclosure.

In FIG. 7, a gate 701, a device UWB component 703, and a device applet 705 may correspond to the gate 601, the UWB component 607 of the mobile device 603, and the transportation applet 613 of the mobile device 603 in FIG. 6, respectively.

Referring to FIG. 7, in operation 702, the device UWB component 703 may transmit a SELECT command to the device applet 705. In an embodiment, the SELECT command may be a command for selecting the device applet 703.

In operation 704, the device applet 705 may transmit a SELECT response to the device UWB component 703 in response to reception of the SELECT command. In an embodiment, the SELECT response may be transmitted to the device UWB component 703 in response to the SELECT command when activation of the device applet 705 is possible.

According to an embodiment, operations 702 and 704 may show applet pre-selection performed before communication with a specific gate (e.g., the gate 701). In an embodiment, applet pre-selection may indicate, among operations according to an APDU protocol, applet selection performed internally in the mobile device without involvement of a specific gate.

When the device applet 705 is selected based on operations 702 and 704, the device applet 705 may be activated to perform communication, as in operations 706 to 712, with the gate 701 via the device UWB component 703. Operations 706 to 712 may show an example of APDU command/response transmission and reception.

In operation 706, the gate 701 may transmit an initialize card command to the device applet 705. The initialize card command may include information of an amount to be paid by the device applet 705, and the like.

In operation 708, the device applet 705 may transmit an initialize card response to the gate 701 in response to the initialize card command. The initialize card response may include authentication information for payment and balance information stored in the device applet 705, and the like. The gate 701 may determine, based on the initialize card response, whether payment is possible by the device applet 705.

In operation 710, when it is determined that payment is possible by the device applet 705, the gate 701 may transmit a purchase card command to the device applet 705. The purchase card command may include, for example, information indicating to make a payment.

In operation 712, the device applet 705 may transmit a purchase card response to the gate 701 in response to the purchase card command. The purchase card response may include, for example, information for payment.

Operations 706 to 712 are operations performed based on UWB, and may be performed during four ranging rounds (round #1 721, round #2 722, round #3 723, and round #4 724) (e.g., 288×4=1152 ms).

According to various embodiments of the disclosure, based on the applet pre-selection as in operations 702 and 704, the number of APDU commands/responses transmitted and received via UWB may be reduced. Accordingly, when various embodiments of the disclosure are performed, a required time may be shortened compared to an existing technology that requires operations during at least 6 ranging rounds (e.g., 288×6=1728 ms).

Figure 8:
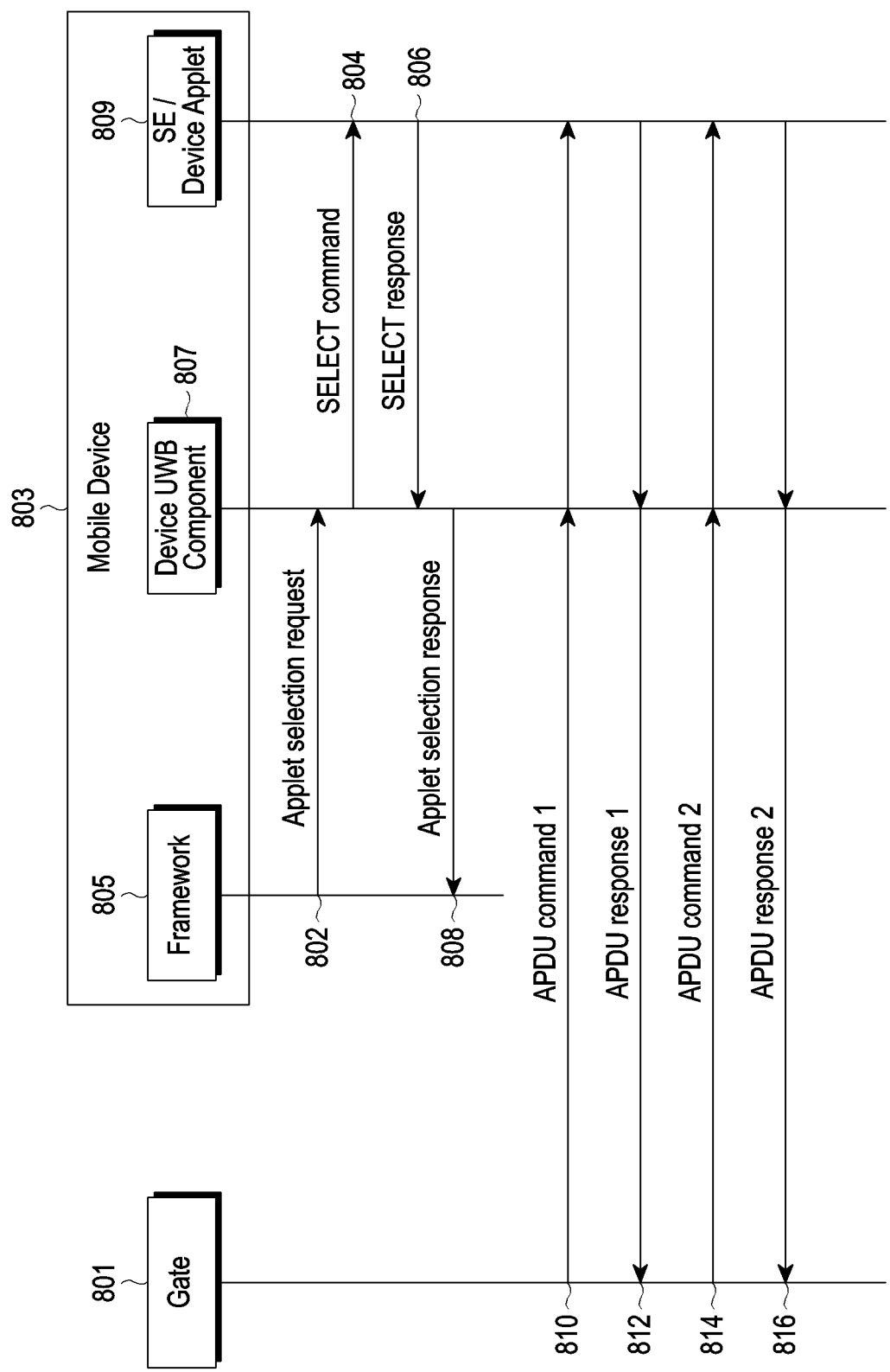
FIG. 8 is a signal flowchart illustrating a UWB communication operation based on applet pre-selection in response to a framework request according to various embodiments of the disclosure.

FIG. 8 is a signal flowchart illustrating a UWB communication operation based on applet pre-selection in response to a framework request according to various embodiments of the disclosure.

In FIG. 8, a gate 801 and a mobile device 803 may correspond to the gate 601 and the mobile device 603 in FIG. 6, respectively. In addition, a framework 805, a device UWB component 807, and an SE/device applet 809 which are included in the mobile device 803 may correspond to the AP/apps or framework 605, the UWB component 607, and the transportation applet 613 of the secure component 609 in FIG. 6, respectively.

In an embodiment, applet pre-selection may be performed based on a request of the framework 805. Referring to FIG. 8, in operation 802, the framework 805 may transmit an applet selection request to the device UWB component 807.

In operation 804, the device UWB component 807 may transmit a SELECT command to the SE/device applet 809. In an embodiment, the SELECT command may be a command for selecting the SE/device applet 809.

In operation 806, the SE/device applet 809 may transmit a SELECT response to the device UWB component 807 in response to reception of the SELECT command. In an embodiment, the SELECT response may be transmitted to the device UWB component 807 in response to the SELECT command when activation of the SE/device applet 809 is possible.

In operation 808, when the SELECT response is received, the device UWB component 807 may identify that applet selection has been completed and may transmit an applet selection response to the framework 805.

In a state where the SE/device applet 809 is selected, the device UWB component 807 may relay communication between the gate 801 and the device UWB component 807, as shown in operations 810 to 816.

In operation 810, when APDU command 1 is received from the gate 801, the device UWB component 807 may transfer received APDU command 1 to the SE/device applet 809.

In operation 812, when APDU response 1 is received from the SE/device applet 809, the device UWB component 807 may transfer received APDU response 1 to the gate 801.

In operation 814, when APDU command 2 is received from the gate 801, the device UWB component 807 may transfer received APDU command 2 to the SE/device applet 809.

In operation 816, when APDU response 2 is received from the SE/device applet 809, the device UWB component 807 may transfer received APDU response 2 to the gate 801.

APDU command/response transmission and reception between the gate 801 and the device UWB component 807 may be additionally performed, and APDU commands 1 and 2 and APDU responses 1 and 2 of operations 810 to 816 may correspond to the initialize card command, the purchase card command, the initialize card response, and the purchase card response in FIG. 7.

Hereinafter, with reference to FIG. 9, an operation of the device UWB component 807 will be described.

Figure 9:
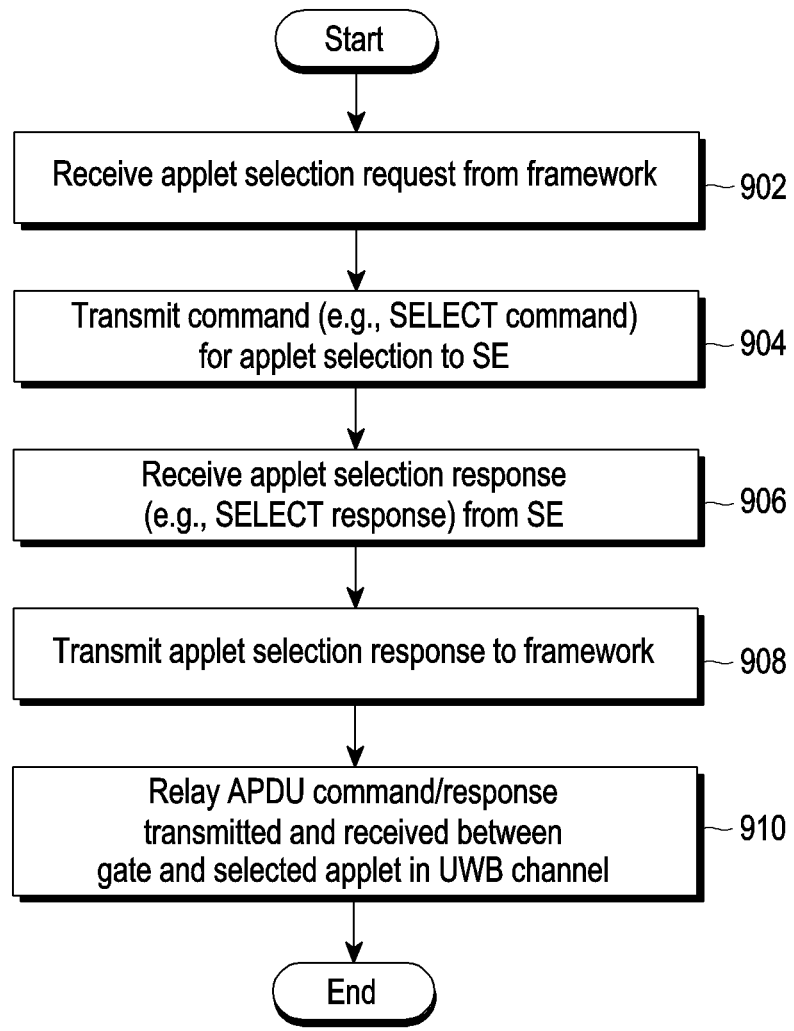
FIG. 9 is a flowchart illustrating an example of a device UWB component operation according to various embodiments of the disclosure.

FIG. 9 is a flowchart illustrating an example of a device UWB component operation according to various embodiments of the disclosure.

Referring to FIG. 9, in operation 902, the device UWB component 807 may receive an applet selection request from the framework 805.

In operation 904, the device UWB component 807 may generate and transmit a command (e.g., SELECT command) for selecting an applet to an SE (SE/device applet 809).

In operation 906, the device UWB component 807 may receive an applet selection response (e.g., SELECT response) from the SE.

In operation 908, the device UWB component 807 may transmit the applet selection response to the framework 805.

In operation 910, the device UWB component 807 may relay the APDU command/response transmitted and received between the gate 801 and a selected applet (SE/device applet 809) in a UWB channel.

In order to perform applet pre-selection more efficiently, whether the mobile device is adjacent to the gate may be determined based on UWB ranging. This will be described with reference to FIG. 10.

Figure 10:
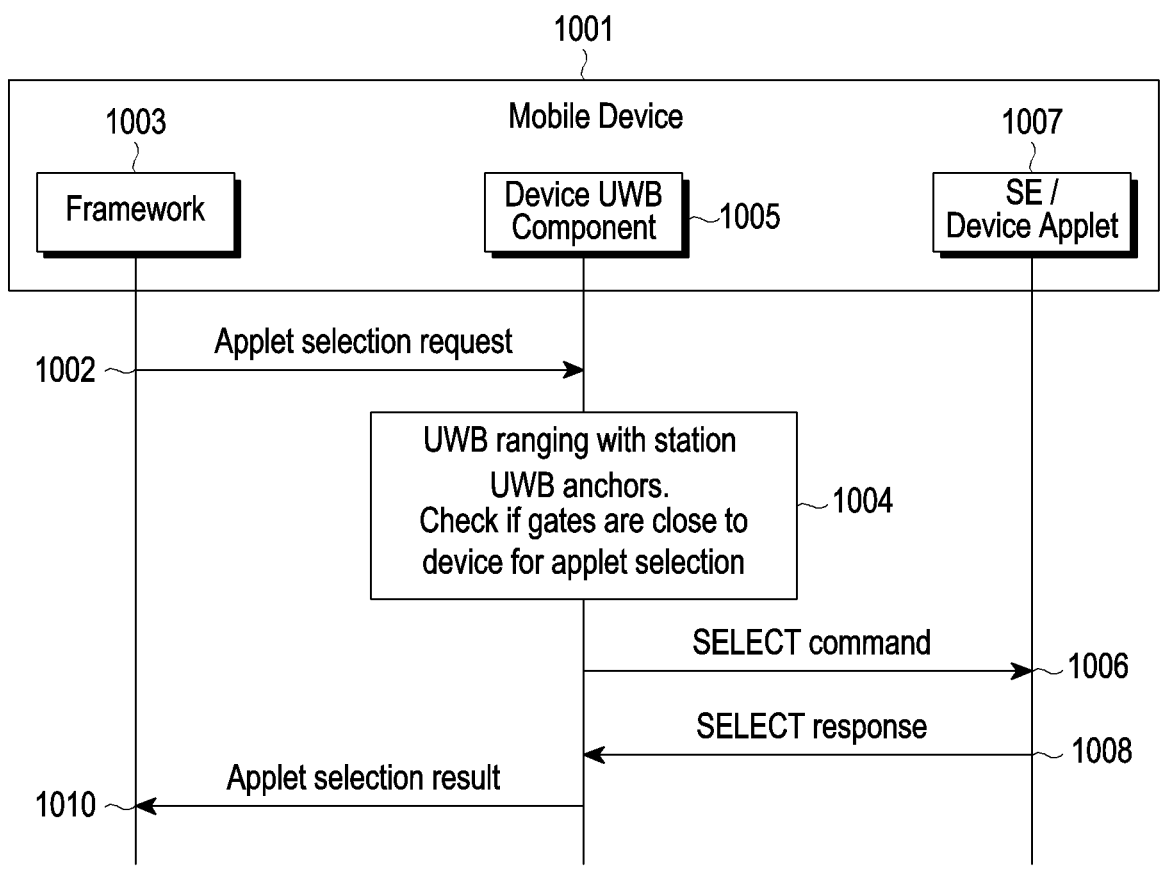
FIG. 10 is a signal flowchart illustrating applet preselection performed based on UWB ranging according to various embodiments of the disclosure.

FIG. 10 is a signal flowchart illustrating applet pre-selection performed based on UWB ranging according to various embodiments of the disclosure.

Referring to FIG. 10, a mobile device 1001 may include a framework 1003, a device UWB component 1005, and an SE/device applet 1007. The mobile device 803 in FIG. 10 may correspond to the mobile device 1001 of FIG. 6. In addition, the framework 1003, the device UWB component 1005, and the SE/device applet 1007 which are included in the mobile device 1001 may correspond to the AP/apps or framework 605, the UWB component 607, and the transportation applet 613 of the secure component 609 in FIG. 6, respectively.

Referring to FIG. 10, in operation 1002, the framework 1003 may transmit an applet selection request to the device UWB component 1005. In an embodiment, when it is identified, via OOB, that the mobile device 1001 has entered a station, the applet selection request may be transmitted to the device UWB component 1005.

In operation 1004, the device UWB component 1005 may estimate a location of the mobile device 1001 by performing UWB ranging with at least one UWB anchor. In an embodiment, at least one UWB anchor may be disposed in a specific area (e.g., a smart gate service area) so as to broadcast a UWB message for a configured time. The UWB message broadcast by at least one UWB anchor may be used by the mobile device 1001 to estimate the location of the mobile device 1001.

In an embodiment, the location of mobile device 1001 may be estimated using a time-based location estimation scheme. The time-based location estimation scheme may include, for example, a downlink-time difference of arrival (DL-TDoA) scheme.

In an embodiment, when at least one UWB anchor is disposed in the station, the device UWB component 1005 may determine whether a distance between the mobile device 1001 and at least one gate in the station is within a threshold distance (e.g., 30 cm or 50 cm), based on estimated location information of the mobile device 1001 and location information of the at least one gate acquired from an application (e.g., smart gate service application). When it is determined that the distance between the mobile device 1001 and the at least one gate is within the threshold distance, the device UWB component 1005 may perform operation 1006.

In operation 1006, the device UWB component 1005 may transmit a SELECT command to the SE/device applet 1007. In an embodiment, the SELECT command may be a command for selecting the SE/device applet 1007.

In operation 1008, the SE/device applet 1007 may transmit a SELECT response to the device UWB component 1005 in response to reception of the SELECT command. In an embodiment, the SELECT response may be transmitted to the device UWB component 1005 in response to the SELECT command when activation of the SE/device applet 1009 is possible.

In operation 1010, when the SELECT response is received, the device UWB component 1005 may identify that applet selection has been completed and may transmit, to the framework 1003, an applet selection result (or applet selection response) to indicate that applet selection has been completed.

Hereinafter, with reference to FIG. 11, an operation of the device UWB component 1005 will be described.

Figure 11:
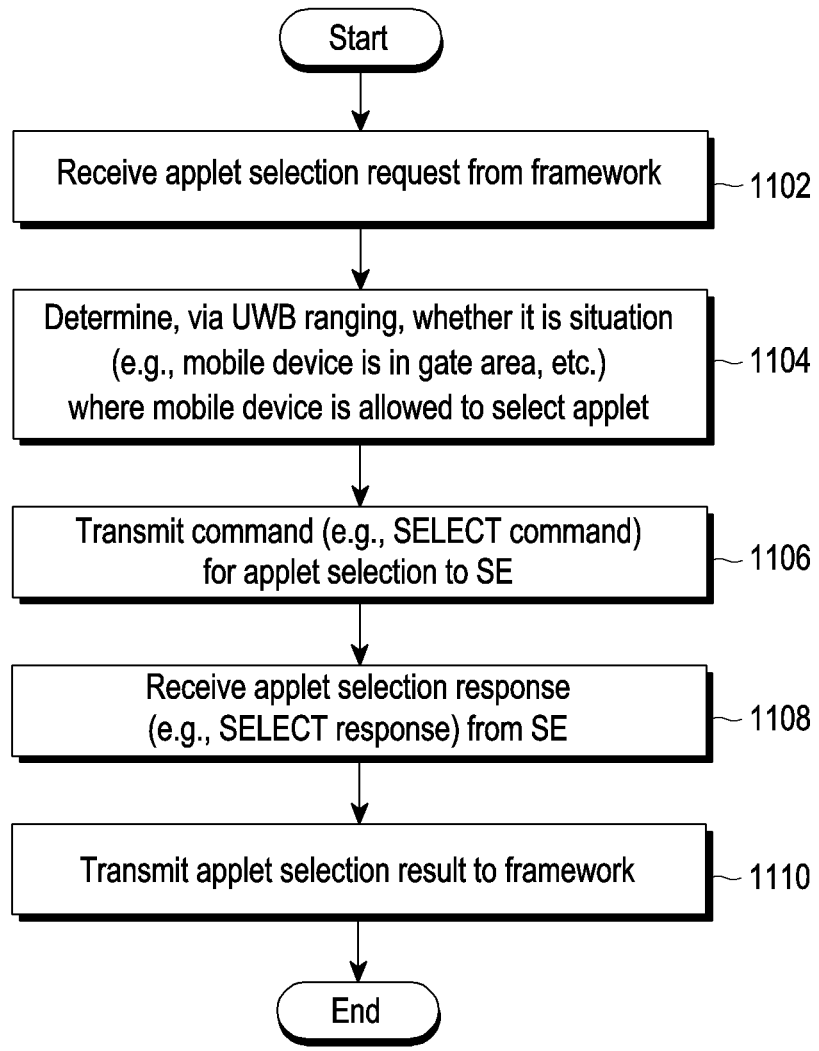
FIG. 11 is a flowchart illustrating another example of a device UWB component operation according to various embodiments of the disclosure.

FIG. 11 is a flowchart illustrating another example of a device UWB component operation according to various embodiments of the disclosure.

Referring to FIG. 11, in operation 1102, the device UWB component 1005 may receive an applet selection request from the framework 1003.

In operation 1104, the device UWB component 1005 may determine, via UWB ranging, whether it is a situation (e.g., the mobile device 1001 is in a gate area (an area within a threshold distance from the gate)) where the mobile device 1001 is allowed to select an applet.

In operation 1106, when it is determined to be a situation for the mobile device 1001 to select an applet, the device UWB component 1005 may transmit, to the SE (SE/device applet 1007), a command (e.g., SELECT command) for selecting an applet.

In operation 1108, when an applet selection response (e.g., SELECT response) is received from the SE, the device UWB component 1005 may determine that applet selection has been completed.

In operation 1110, the device UWB component 1005 may transmit, to the framework 1003, an applet selection result to indicate that applet selection has been completed.

Figure 12:
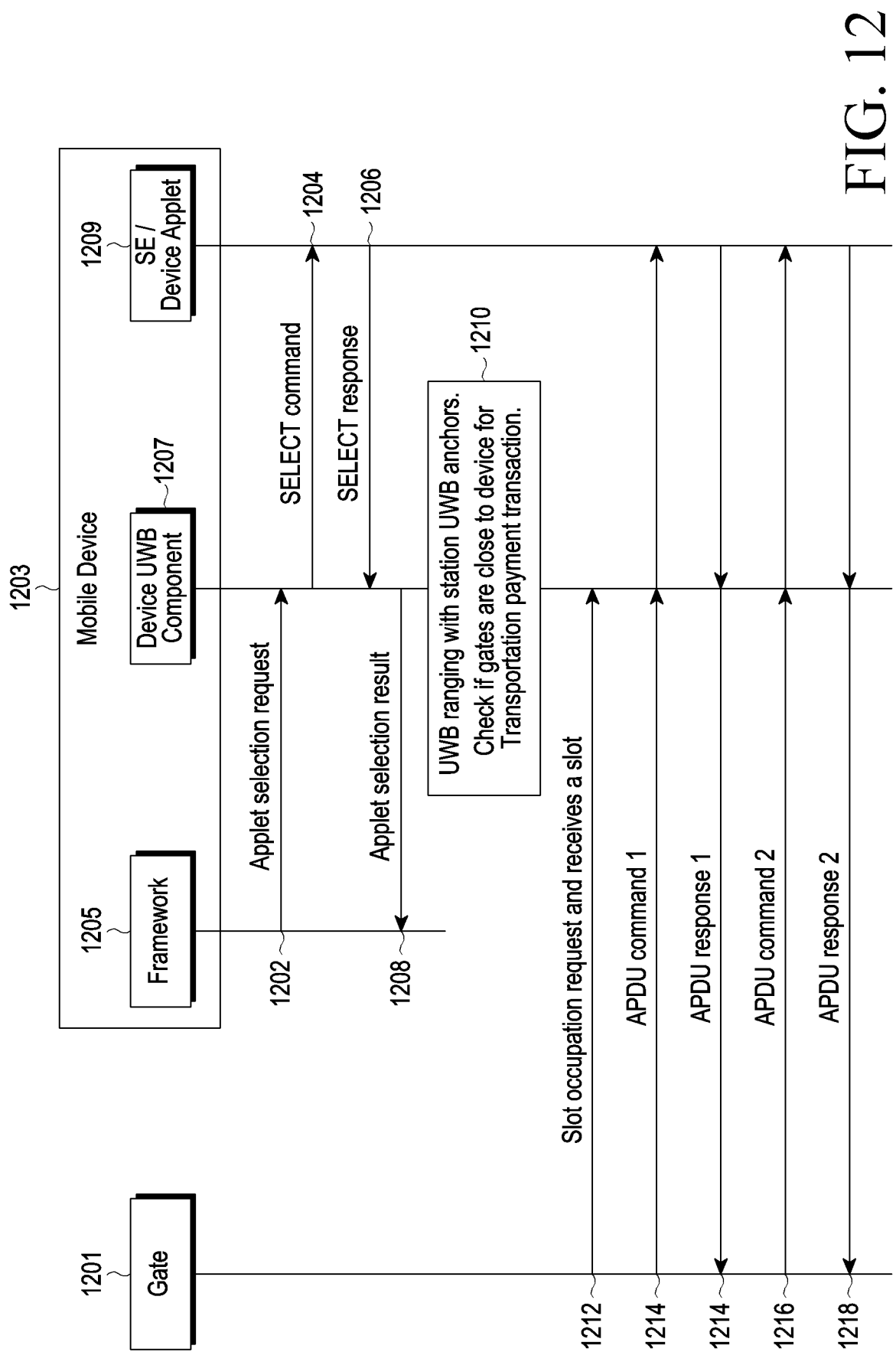
FIG. 12 is a signal flowchart illustrating a UWB communication operation of performing slot allocation after applet selection according to various embodiments of the disclosure.

FIG. 12 is a signal flowchart illustrating a UWB communication operation of performing slot allocation after applet selection according to various embodiments of the disclosure.

In FIG. 12, a gate 1201 and a mobile device 1203 may correspond to the gate 601 and the mobile device 603 in FIG. 6, respectively. In addition, the framework 1205, the device UWB component 1207, and the SE/device applet 1209 which are included in the mobile device 1203 may correspond to the AP/apps or framework 605, the UWB component 607, and the transportation applet 613 of the secure component 609 in FIG. 6, respectively.

Referring to FIG. 12, in operation 1202, the framework 1205 may transmit an applet selection request to the device UWB component 1207. In an embodiment, when it is identified, via OOB, that the mobile device 1203 has entered a station, the applet selection request may be transmitted to the device UWB component 1207.

In operation 1204, the device UWB component 1207 may transmit a SELECT command to the SE/device applet 1209. In an embodiment, the SELECT command may be a command for selecting the SE/device applet 1209.

In operation 1206, the SE/device applet 1209 may transmit a SELECT response to the device UWB component 1207 in response to reception of the SELECT command. In an embodiment, the SELECT response may be transmitted to the device UWB component 1207 in response to the SELECT command when activation of the SE/device applet 1209 is possible.

In operation 1208, when the SELECT response is received, the device UWB component 1207 may identify that applet selection has been completed and may transmit, to the framework 1205, an applet selection result (or applet selection response) which indicates that applet selection has been completed.

In operation 1210, the device UWB component 1207 may estimate a location of the mobile device 1203 by performing UWB ranging with at least one UWB anchor. In an embodiment, at least one UWB anchor may be disposed in a specific area (e.g., a smart gate service area) so as to broadcast a UWB message for a configured time. The UWB message broadcast by at least one UWB anchor may be used by the mobile device 1203 to estimate the location of the mobile device 1203.

In an embodiment, the location of mobile device 1203 may be estimated using a time-based location estimation scheme, such as DL-TDoA. In an embodiment, when at least one UWB anchor is disposed in the station, the device UWB component 1207 may identify whether there is a gate (or a gate in the closest distance to the mobile device 1203), the distance of which from the mobile device 1203 is within a threshold distance (e.g., 30 cm or 50 cm), among at least one gate, based on estimated location information of the mobile device 1203 and location information for at least one gate within the station, which is acquired from an application (e.g., smart gate service application), etc.

In operation 1212, if there is the gate 1201 as a gate (or a gate in the closest distance to the mobile device 1203), the distance of which from the mobile device 1203 is within the threshold distance, among at least one gate, the device UWB component 1207 may transmit a slot occupation request to the gate 1201, and may be allocated with a slot from the gate 1201. The allocated slot may be used for APDU command/response transmission and reception between the gate 1201 and the SE/device applet 1209 in a UWB channel. The APDU command/response transmission and reception may be, for example, operations 1214 to 1220.

In operation 1214, when APDU command 1 is received from the gate 1201, the device UWB component 1207 may transfer received APDU command 1 to the SE/device applet 1209.

In operation 1216, when APDU response 1 is received from the SE/device applet 1209, the device UWB component 1207 may transfer received APDU response 1 to the gate 1201.

In operation 1218, when APDU command 2 is received from the gate 1201, the device UWB component 1207 may transfer received APDU command 2 to the SE/device applet 1209.

In operation 1220, when APDU response 2 is received from the SE/device applet 1209, the device UWB component 1207 may transfer received APDU response 2 to the gate 1201.

The APDU command/response transmission and reception between the gate 1201 and the device UWB component 1207 may be additionally performed, and APDU commands 1 and 2 and APDU responses 1 and 2 of operations 1214 to 1220 may correspond to the initialize card command, the purchase card command, the initialize card response, and the purchase card response in FIG. 7.

Hereinafter, with reference to FIG. 13, an operation of the device UWB component 1207 will be described.

Figure 13:
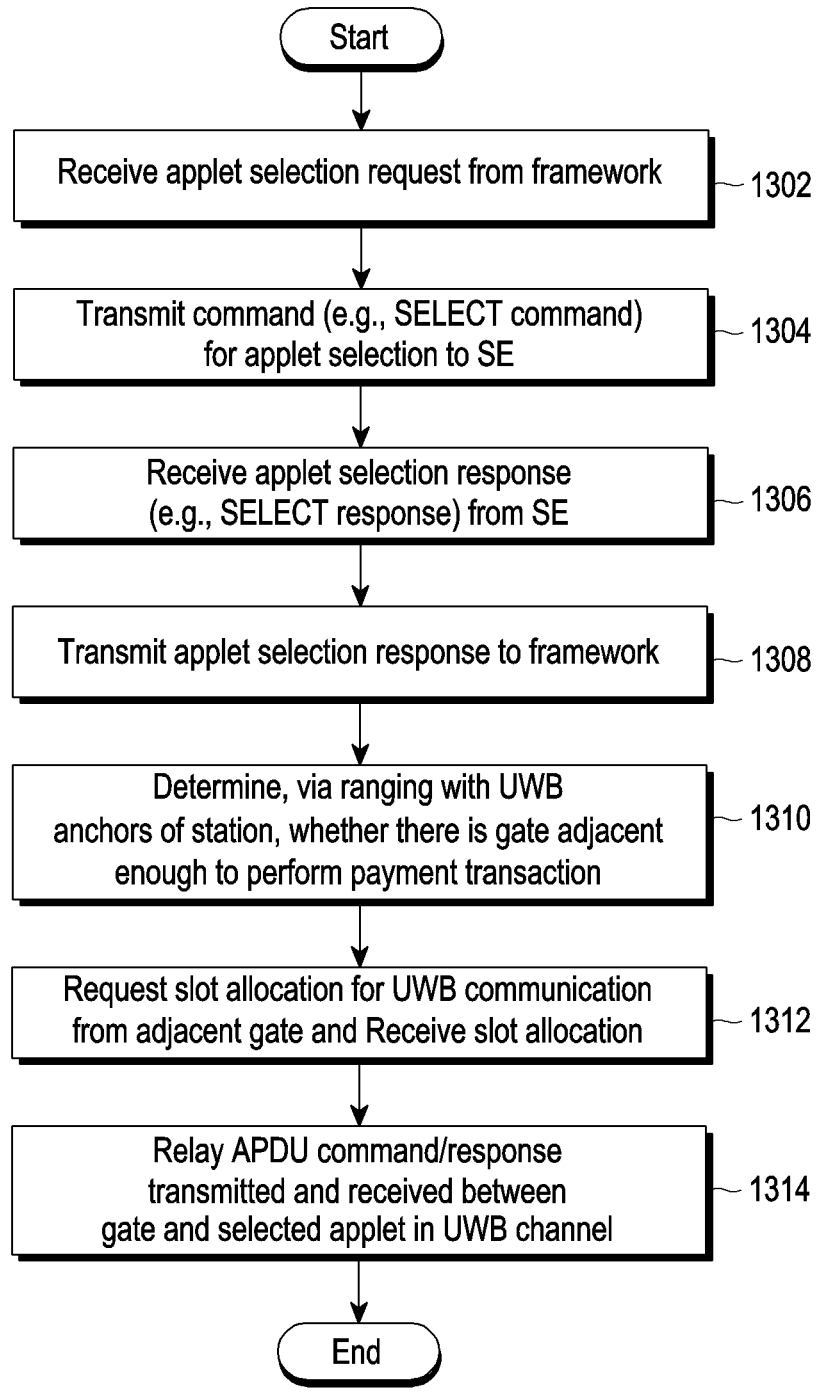
FIG. 13 is a flowchart illustrating another example of a device UWB component operation according to various embodiments of the disclosure.

FIG. 13 is a flowchart illustrating another example of a device UWB component operation according to various embodiments of the disclosure.

Referring to FIG. 13, in operation 1302, the device UWB component 1207 may receive an applet selection request from the framework 1205.

In operation 1304, the device UWB component 1207 may generate and transmit a command (e.g., SELECT command) for selecting an applet to an SE (SE/device applet 1209).

In operation 1306, the device UWB component 1207 may receive an applet selection response (e.g., SELECT response) from the SE.

In operation 1308, the device UWB component 1207 may transmit the applet selection response to the framework 1205.

In operation 1310, the device UWB component 1207 may determine, via ranging with UWB anchors of the station, whether there is a gate (e.g., the gate 1201) adjacent enough to perform a payment transaction.

In operation 1312, the device UWB component 1207 may request UWB slot allocation for UWB communication from the adjacent gate 1201, so as to be allocated with a UWB slot.

In operation 1314, the device UWB component 1207 may relay the APDU command/response transmitted and received between the gate 1201 and a selected applet (SE/device applet 1209) in a UWB channel.

Figure 14:
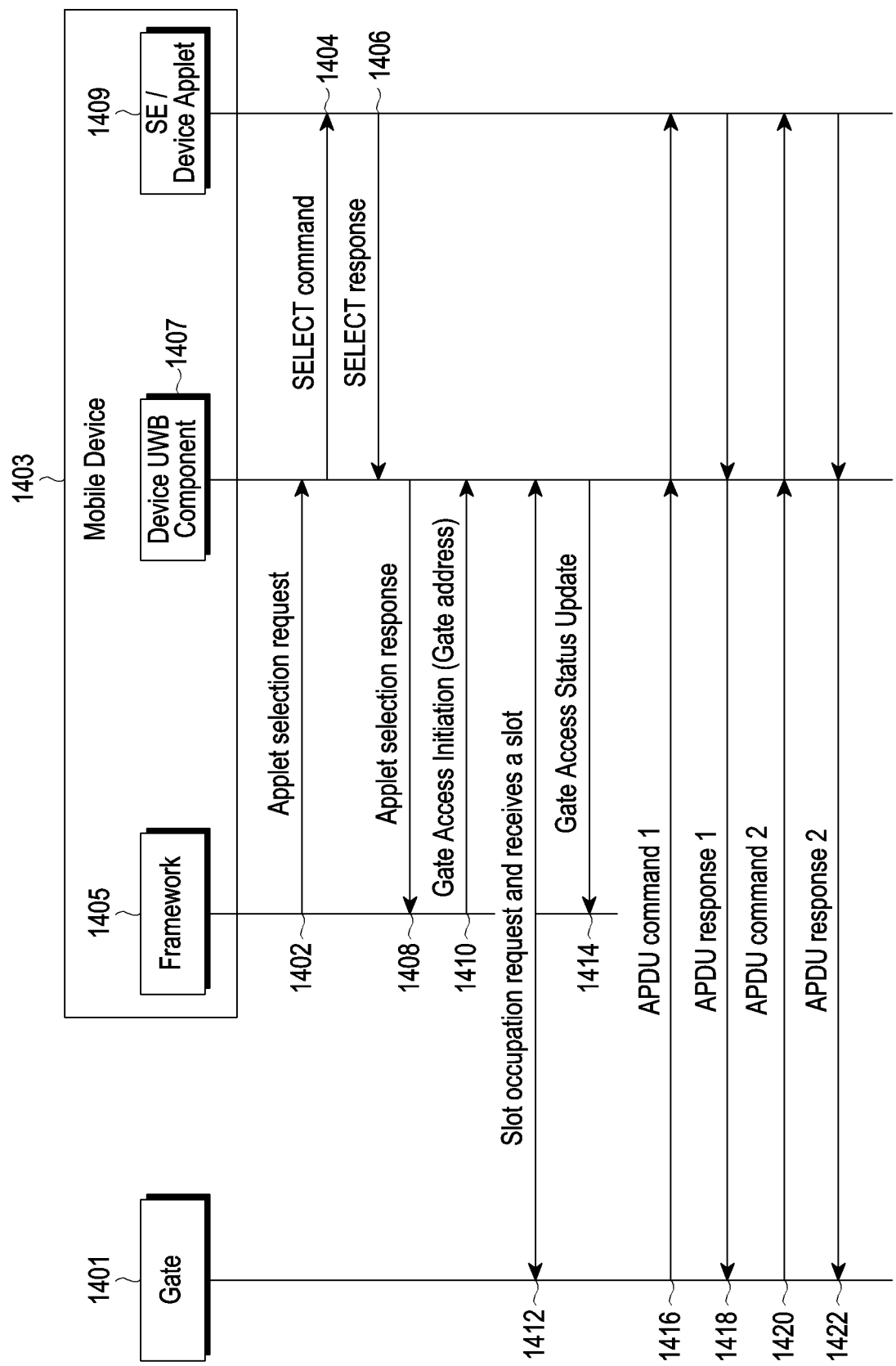
FIG. 14 is a signal flowchart illustrating a UWB communication operation of performing slot allocation to a gate selected by framework after applet selection according to various embodiments of the disclosure.

FIG. 14 is a signal flowchart illustrating a UWB communication operation of performing slot allocation to a gate selected by framework after applet selection according to various embodiments of the disclosure.

In FIG. 14, a gate 1401 and a mobile device 1403 may correspond to the gate 601 and the mobile device 603 in FIG. 6, respectively. In addition, the framework 1405, the device UWB component 1407, and the SE/device applet 1409 which are included in the mobile device 1403 may correspond to the AP/apps or framework 605, the UWB component 607, and the transportation applet 613 of the secure component 609 in FIG. 6, respectively.

Referring to FIG. 14, in operation 1402, the framework 1405 may transmit an applet selection request to the device UWB component 1407. In an embodiment, when it is identified, via OOB, that the mobile device 1403 has entered a station, the applet selection request may be transmitted to the device UWB component 1407.

In operation 1404, the device UWB component 1407 may transmit a SELECT command to the SE/device applet 1409. In an embodiment, the SELECT command may be a command for selecting the SE/device applet 1409.

In operation 1406, the SE/device applet 1409 may transmit a SELECT response to the device UWB component 1407 in response to reception of the SELECT command. In an embodiment, the SELECT response may be transmitted to the device UWB component 1407 in response to the SELECT command when activation of the SE/device applet 1409 is possible.

In operation 1408, when the SELECT response is received, the device UWB component 1407 may identify that applet selection has been completed and may transmit, to the framework 1405, an applet selection response indicating that applet selection has been completed.

In operation 1410, the framework 1405 may transmit gate access initiation to the device UWB component 1407. In an embodiment, the gate access initiation may include a gate address and/or a gate ID (identifier) as identification information of the gate 1401. The gate 1401 may be a gate closest to the mobile device 1403, which is selected by the framework 1405. The framework 1405 may estimate a location of the mobile device 1403 by performing a location estimation scheme (e.g., DL-TdoA scheme) for the mobile device 1403, and may select the gate 1401 as a gate closest to the estimated location.

In an embodiment, when the gate access initiation is received from the framework 1405, the device UWB component 1407 may identify the gate 1401 to access, based on information included in the gate access initiation.

In operation 1412, the device UWB component 1407 may transmit a slot occupation request to the gate 1401, and may be allocated with a slot from the gate 1401.

In operation 1414, when the slot is allocated from the gate 1401, the device UWB component 1407 may transmit a gate access status update to the framework 1405. In an embodiment, the gate access status update may include information indicating that access to the gate 1401 has been successful.

On the other hand, the device UWB component 1407 may not be allocated with a slot from the gate 1401. In this case, the device UWB component 1407 may transmit, to the framework 1405, the gate access status update including information indicating that access to the gate 1401 has failed. Then, the framework 1405 may re-estimate the location of the mobile device 1403, reselect a gate closest to the estimated location, and perform operation 1410 and subsequent operations again.

When access to the gate 1401 is successful, that is, when a slot is allocated from the gate 1401, the device UWB component 1407 may relay the APDU command/response transmitted and received between the gate 1401 and the SE/device applet 1409, based on the allocated slot. According to an embodiment, the device UWB component 1407 may perform operations 1416 to 1422.

In operation 1416, when APDU command 1 is received from the gate 1401, the device UWB component 1407 may transfer received APDU command 1 to the SE/device applet 1409.

In operation 1418, when APDU response 1 is received from the SE/device applet 1409, the device UWB component 1407 may transfer received APDU response 1 to the gate 1418.

In operation 1420, when APDU command 2 is received from the gate 1401, the device UWB component 1407 may transfer received APDU command 2 to the SE/device applet 1409.

In operation 1422, when APDU response 2 is received from the SE/device applet 1409, the device UWB component 1407 may transfer received APDU response 2 to the gate 1401.

The APDU command/response transmission and reception between the gate 1401 and the device UWB component 1407 may be additionally performed, and APDU commands 1 and 2 and APDU responses 1 and 2 of operations 1416 to 1422 may correspond to the initialize card command, the purchase card command, the initialize card response, and the purchase card response in FIG. 7.

Hereinafter, with reference to FIG. 15, an operation of the device UWB component 1407 will be described.

Figure 15:
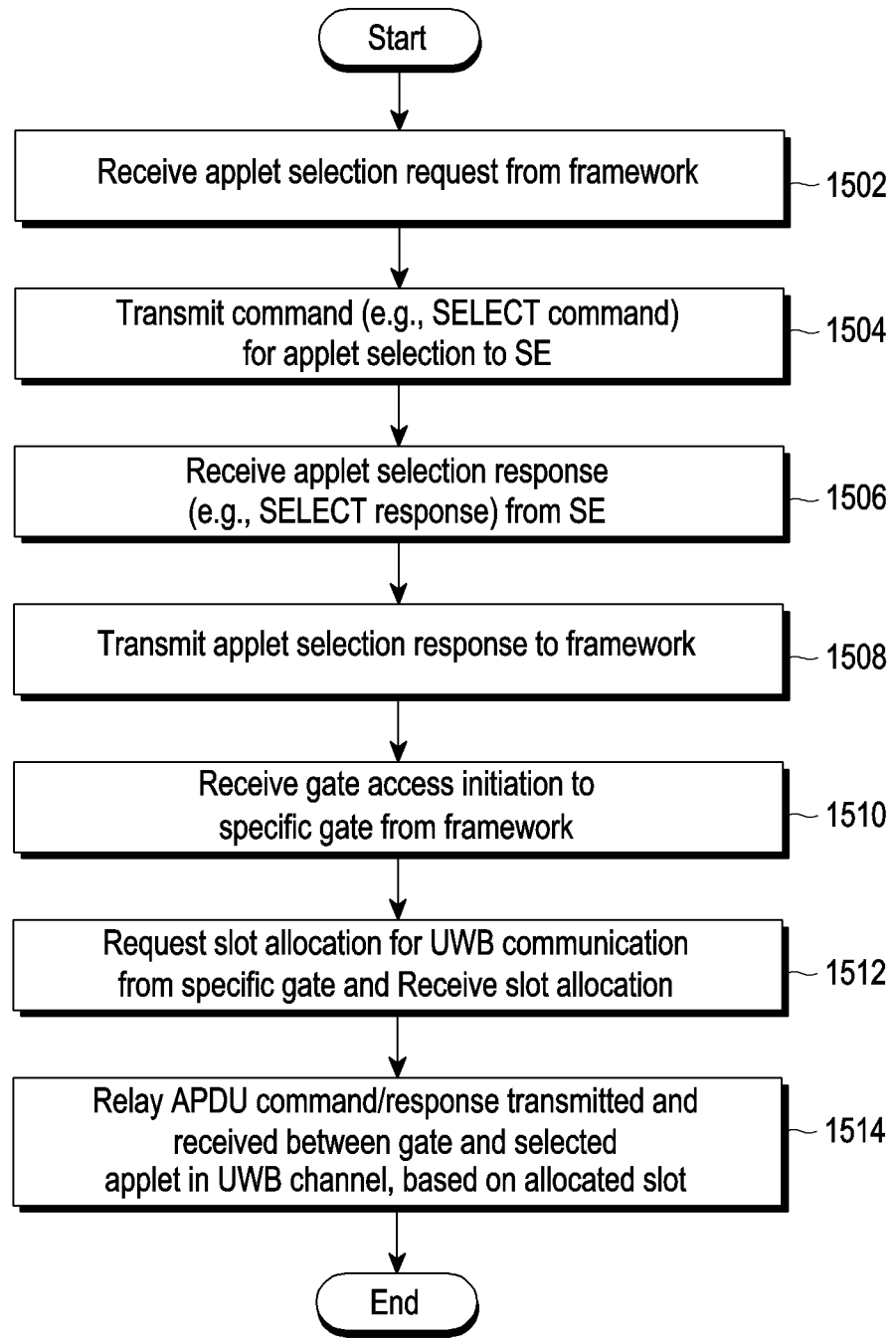
FIG. 15 is a flowchart illustrating another example of a device UWB component operation according to various embodiments of the disclosure.

FIG. 15 is a flowchart illustrating another example of a device UWB component operation according to various embodiments of the disclosure.

Referring to FIG. 15, in operation 1502, the device UWB component 1407 may receive an applet selection request from the framework 1405.

In operation 1504, the device UWB component 1407 may generate and transmit a command (e.g., SELECT command) for selecting an applet to an SE (SE/device applet 1409).

In operation 1506, the device UWB component 1407 may receive an applet selection response (e.g., SELECT response) from the SE.

In operation 1508, the device UWB component 1407 may transmit the applet selection response to the framework 1405.

In operation 1510, the device UWB component 1407 may receive, from the framework 1405, gate access initiation to a specific gate (e.g., the gate 1401). In an embodiment, the gate access initiation may include identification information (e.g., a gate address and/or a gate ID) of the specific gate. The specific gate is a gate adjacent to the mobile device 1403 and may be determined based on location estimation of the mobile device 1403 by the framework 1405.

In operation 1512, the device UWB component 1407 may request slot allocation for UWB communication from the specific gate, so as to be allocated with a slot from the specific gate.

In operation 1514, the device UWB component 1407 may relay the APDU command/response transmitted and received between the gate and the selected applet in a UWB channel, based on the allocated slot.

Figure 16:
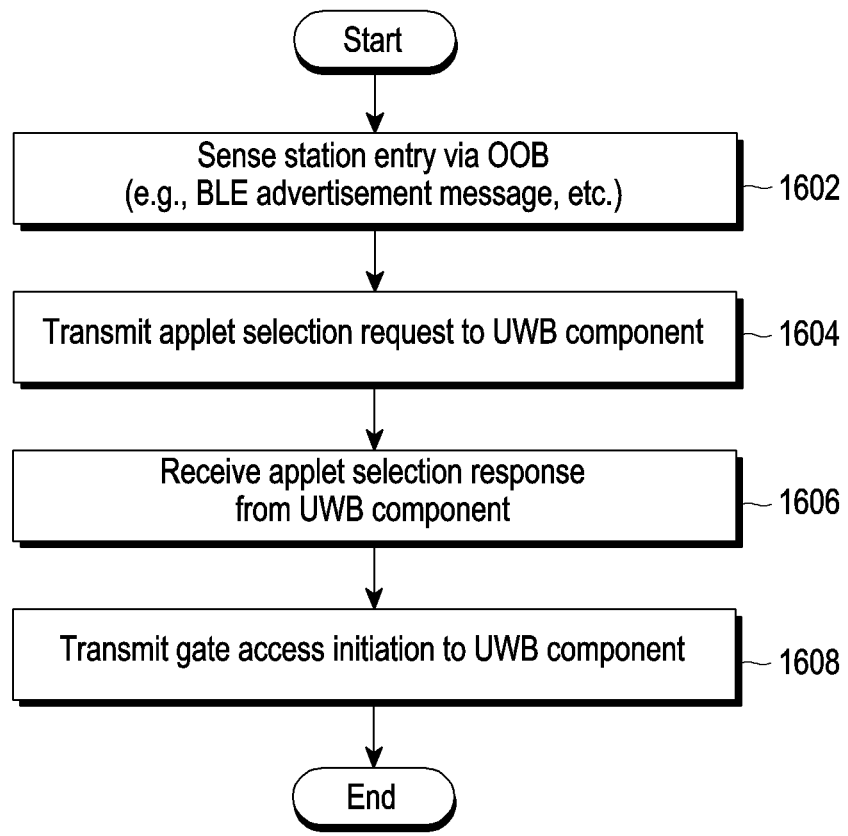
FIG. 16 is a flowchart illustrating a framework operation related to applet selection according to various embodiments of the disclosure.

FIG. 16 is a flowchart illustrating a framework operation related to applet selection according to various embodiments of the disclosure.

Referring to FIG. 16, a framework (e.g., the framework 605, the framework 805, the framework 1003, the framework 1205, or the framework 1405) according to various embodiments of the disclosure may detect, via OOB (e.g., BLE advertisement message, etc.), a mobile device entering a station, in operation 1602.

In operation 1604, the framework may transmit an applet selection request to a UWB component. In an embodiment, the applet selection request may include an applet ID to be selected, and the UWB component may perform applet selection based on the applet ID included in the applet selection request.

In operation 1606, the framework may receive an applet selection response from the UWB component. In an embodiment, the applet selection response may indicate that applet selection has been completed.

In operation 1608, the framework may transmit gate access initiation to the UWB component. In an embodiment, the gate access initiation may be transmitted to trigger communication with a gate, and may include identification information for the gate (e.g., a gate address and/or a gate ID, etc.). According to an embodiment, operation 1608 may be optionally performed.

Figure 17:
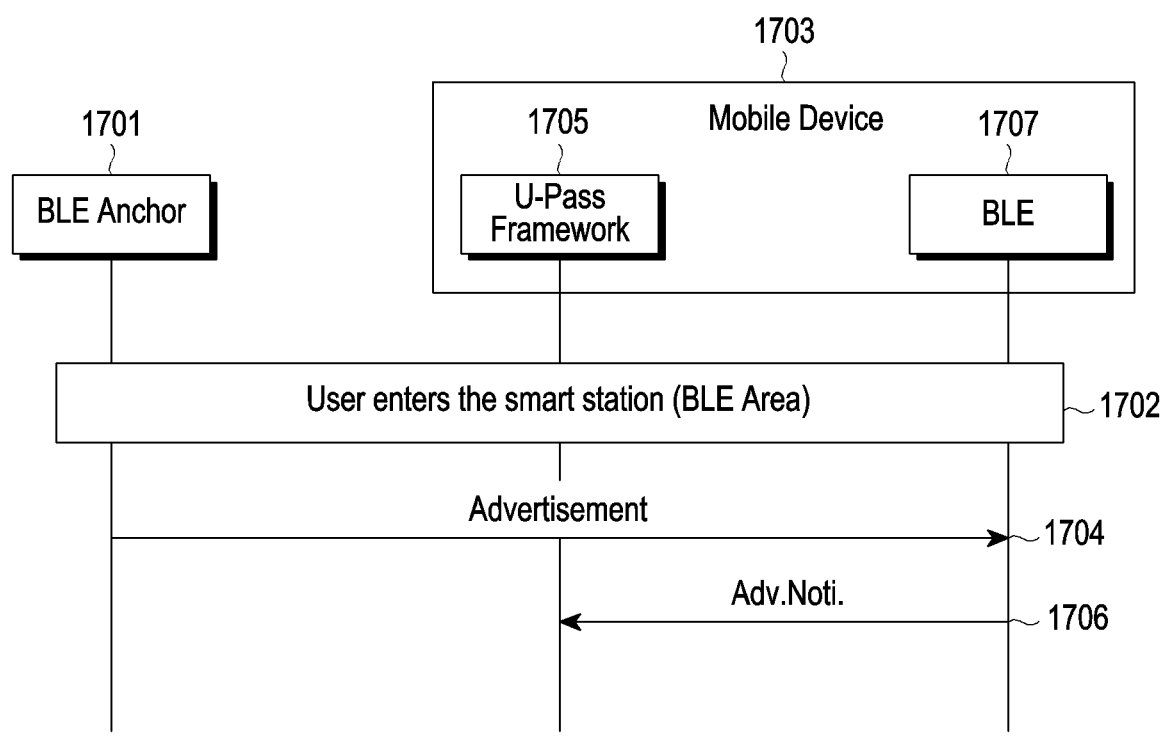
FIG. 17 is a signal flowchart illustrating an example of sensing station entry via a BLE operation according to various embodiments of the disclosure.
Figure 18:
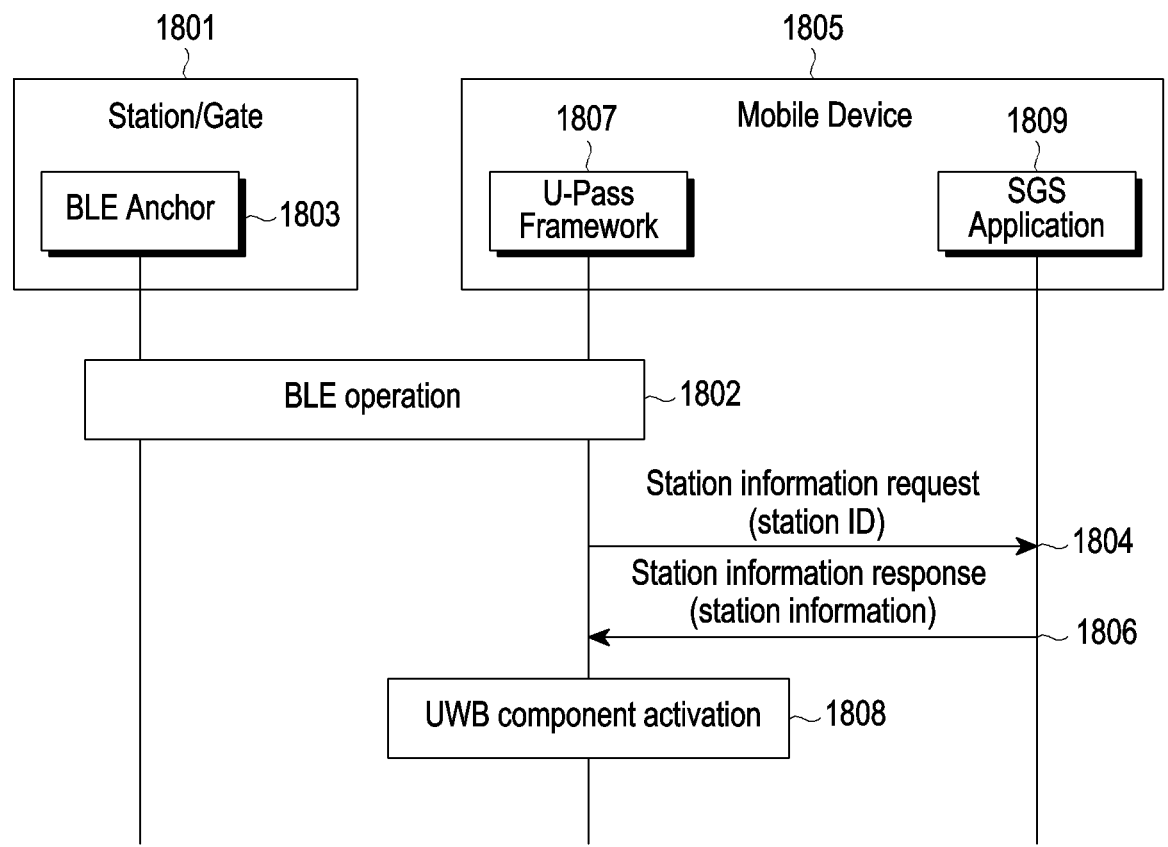
FIG. 18 is a signal flowchart illustrating another example of sensing station entry via a BLE operation according to various embodiments of the disclosure.

Operation 1602 may be performed based on the operations illustrated in FIG. 17 and/or FIG. 18.

FIG. 17 is a signal flowchart illustrating an example of sensing station entry via a BLE operation according to various embodiments of the disclosure.

FIG. 17 illustrates a BLE operation flow between a BLE anchor 1701 and a mobile device 1703. The BLE anchor 1701 is located in a BLE area and may periodically broadcast advertisement messages. The mobile device 1703 may include a U-pass framework 1705 and a BLE component 1707.

Referring to FIG. 17, in operation 1702, a user of the mobile device 1703 may enter a smart station, that is, the BLE area.

In operation 1704, the BLE component 1707 may receive an advertisement message from the BLE Anchor 1701 in the BLE area.

In operation 1706, the BLE component 1707 may notify the U-pass framework 1705 that the advertisement message has been received, and may transfer data (e.g., a station ID, a smart gate system ID, service data, service protocol information, UWB channel information, etc.) of the advertisement message to the U-pass framework 1705.

The U-pass framework 1705 may proceed with a preparation procedure for a service (e.g., smart gate service) when the advertisement message is received. For example, the U-pass framework 1705 may identify a station that the mobile device 1703 has entered, based on the station ID included in the received advertisement message. In addition, the U-pass framework 1705 may perform an operation to use a smart gate service, based on the smart gate system ID, service data, service protocol information, UWB channel information, etc. included in the advertisement message.

FIG. 18 is a signal flowchart illustrating another example of sensing station entry via a BLE operation according to various embodiments of the disclosure.

FIG. 18 illustrates an operation flow between a mobile device 1805 and a BLE anchor 1803 in a station 1801 including a gate. According to an embodiment, the BLE anchor 1803 may periodically broadcast advertisement messages. The mobile device 1805 may include a U-pass framework 1807 and a smart gate service (SGS) application 1809.

Referring to FIG. 18, in operation 1802, the BLE anchor 1803 may perform a BLE operation. In an embodiment, the BLE operation may include the operations illustrated in FIG. 17. For example, the BLE operation may include, when the mobile device 1805 enters the station 1801, receiving, by the U-pass framework 1807, an advertisement message including corresponding station information including a station ID.

In operation 1804, the U-pass framework 1807 may transmit a station information request including the station ID to the SGS application 1809. In an embodiment, the station information request may represent a request to process a gate ranging protocol with the station 1801.

In operation 1806, the SGS application 1809 may provide station information corresponding to the station ID to the U-pass framework 1807. In an embodiment, the station information may include a gate ID, a gate address and a UWB anchor address, UWB block structure information, a gate access condition, an applet selection condition, etc.

In operation 1808, the U-pass framework 1807 may activate a UWB component when the station information is acquired, and may perform operation 1604 and subsequent operations in FIG. 16.

Figure 19:
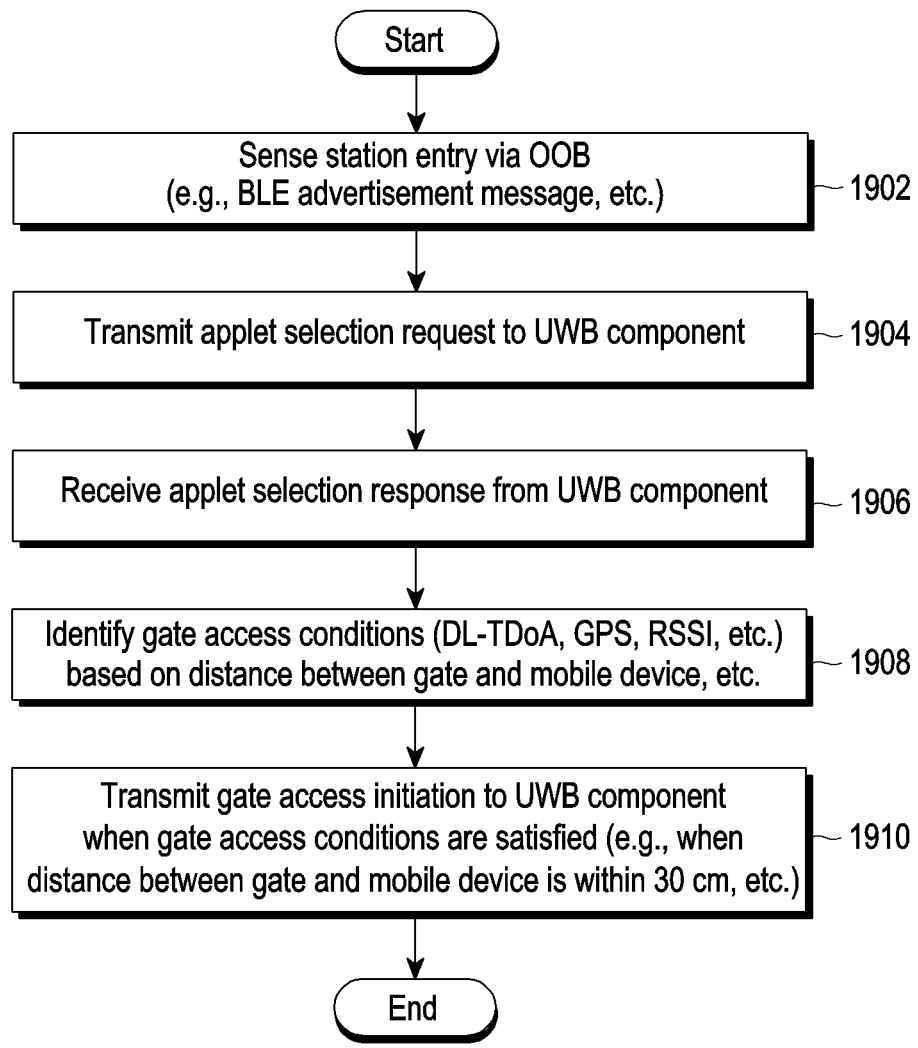
FIG. 19 is a flowchart illustrating another framework operation related to applet selection according to various embodiments of the disclosure.

FIG. 19 is a flowchart illustrating another framework operation related to applet selection according to various embodiments of the disclosure.

Referring to FIG. 19, a framework (e.g., the framework 605, the framework 805, the framework 1003, the framework 1205, or the framework 1405) according to various embodiments of the disclosure may perform operations 1902 to 1906 which are similar to operations 1602 to 1606 of FIG. 16. However, unlike in operation 1608, when a specific condition is satisfied, the framework may perform operations 1908 and 1910 of transmitting gate access initiation.

Specifically, in operation 1902, the framework may sense station entry of a mobile device, via OOB (e.g., a BLE advertisement message, etc.).

In operation 1904, the framework may transmit an applet selection request to a UWB component. In an embodiment, the applet selection request may include an applet ID to be selected, and the UWB component may perform applet selection based on the applet ID included in the applet selection request.

In operation 1906, the framework may receive an applet selection response from the UWB component. In an embodiment, the applet selection response may indicate that applet selection has been completed.

In operation 1908, the framework may identify a gate access condition based on a distance between a gate and the mobile device, etc. In an embodiment, the distance between the gate and the mobile device may be estimated based on at least one of DL-TDoA, a global positioning system (GPS), and a receiver signal strength indicator (RSSI).

In operation 1910, the framework may transmit the gate access initiation to the UWB component when the gate access condition is satisfied (e.g., when the distance between the gate and the mobile device is within 30 cm). In an embodiment, the gate access initiation may be transmitted to trigger communication with the gate, and may include identification information for the gate (e.g., a gate address and/or a gate ID, etc.).

Figure 20:
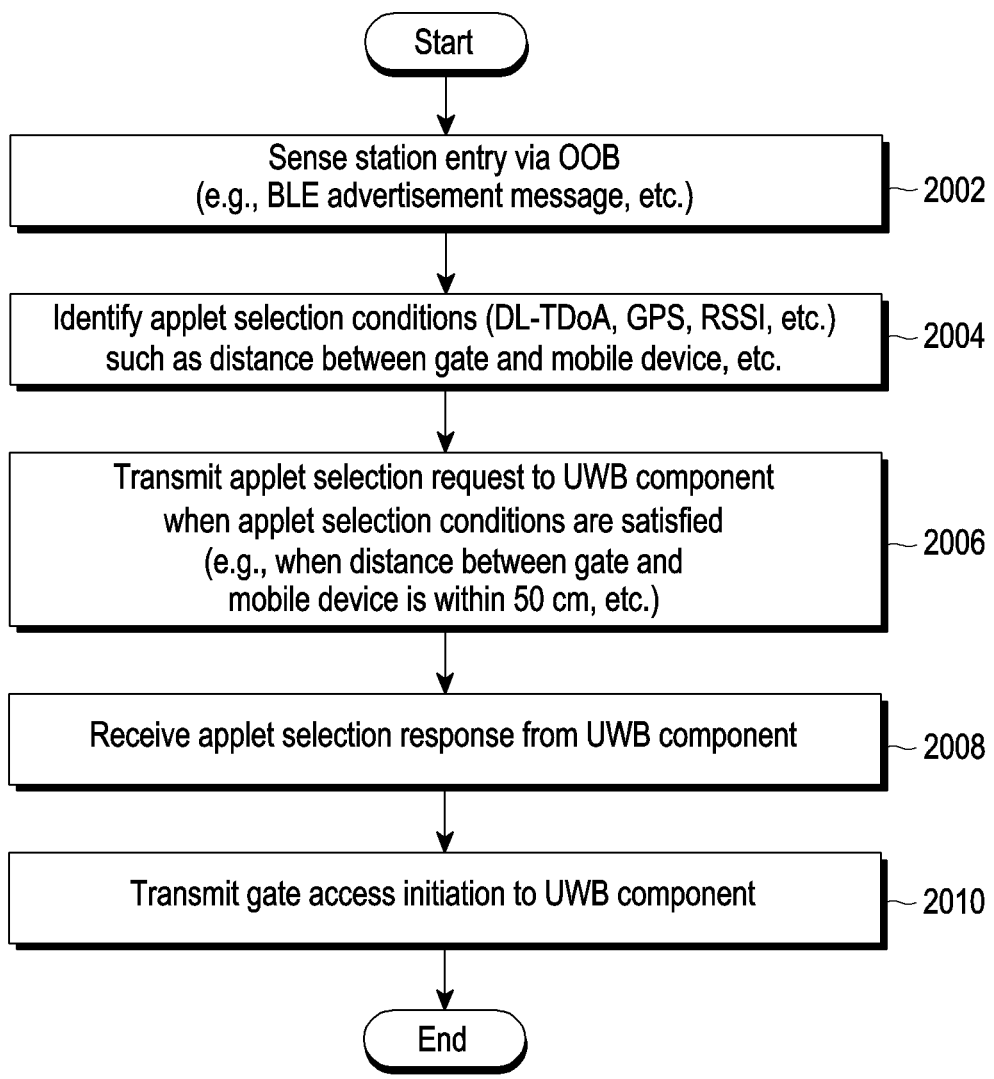
FIG. 20 is a flowchart illustrating another framework operation related to applet selection according to various embodiments of the disclosure.

FIG. 20 is a flowchart illustrating another framework operation related to applet selection according to various embodiments of the disclosure.

Referring to FIG. 20, a framework (e.g., the framework 605, the framework 805, the framework 1003, the framework 1205, or the framework 1405) according to various embodiments of the disclosure may perform operations 2002, 2008, and 2010 which are similar to operations 1602, 1606, and 1608 of FIG. 16. However, unlike in operation 1604, when a specific condition is satisfied, the framework may perform operations 2004 and 2006 for transmitting an applet selection request.

Specifically, in operation 2002, station entry of a mobile device may be sensed via OOB (e.g., a BLE advertisement message, etc.).

In operation 2004, the framework may identify an applet selection condition, such as a distance between a gate and the mobile device. In an embodiment, the distance between the gate and the mobile device may be estimated based on at least one of DL-TDoA, a GPS, and an RSSI.

In operation 2006, the framework may transmit an applet selection request to a UWB component when the applet selection condition is satisfied (e.g., when the distance between the gate and the mobile device is within 50 cm, etc.). In an embodiment, the applet selection request may include an applet ID to be selected, and the UWB component may perform applet selection based on the applet ID included in the applet selection request.

In operation 2008, the framework may receive an applet selection response from the UWB component. In an embodiment, the applet selection response may indicate that applet selection has been completed.

In operation 2010, the framework may transmit gate access initiation to the UWB component. In an embodiment, the gate access initiation may be transmitted to trigger communication with the gate, and may include identification information for the gate (e.g., a gate address and/or a gate ID, etc.). According to an embodiment, operation 2010 may be optionally performed.

Figure 21:
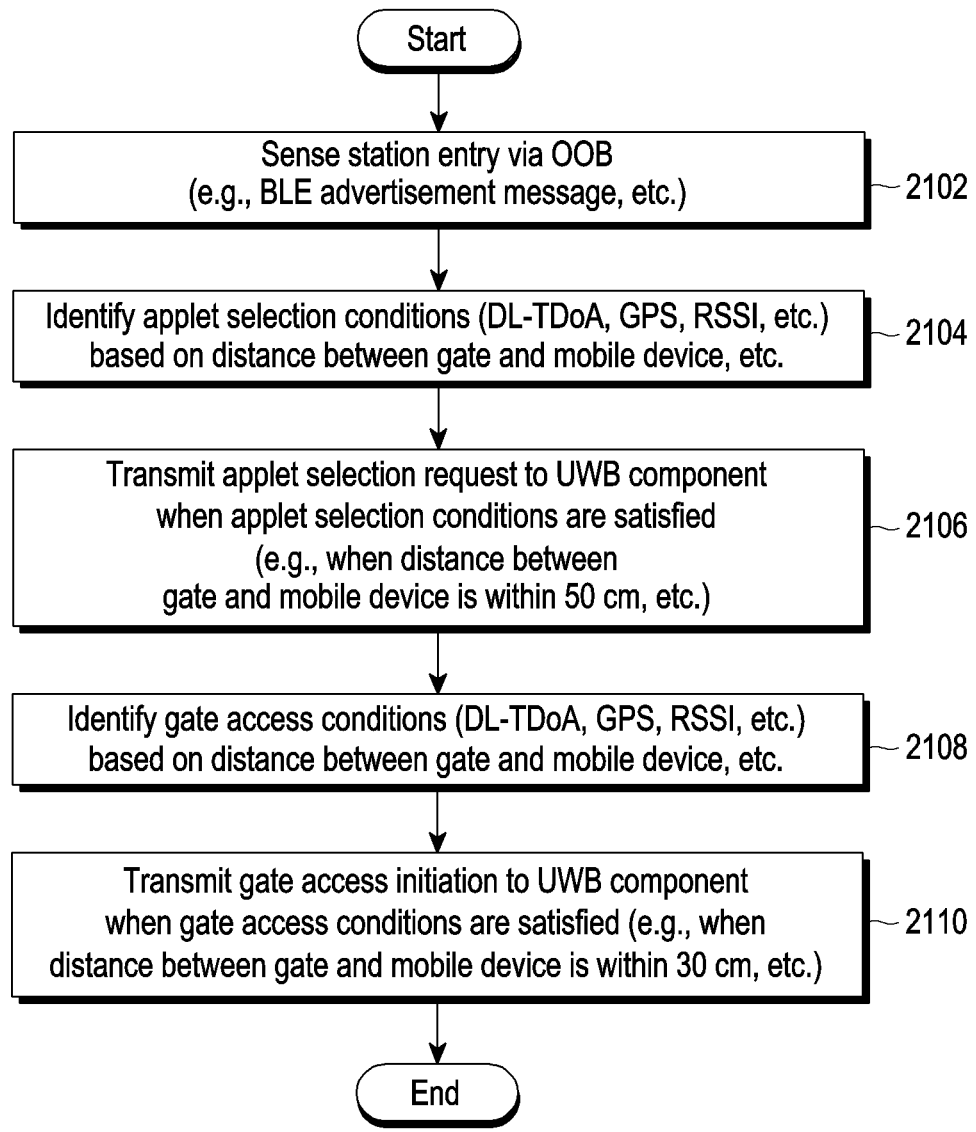
FIG. 21 is a flowchart illustrating another framework operation related to applet selection according to various embodiments of the disclosure.

FIG. 21 is a flowchart illustrating another framework operation related to applet selection according to various embodiments of the disclosure.

A framework (e.g., the framework 605, the framework 805, the framework 1003, the framework 1205, or the framework 1405) according to various embodiments of the disclosure may transmit an applet selection request and gate access initiation when respective specific conditions are satisfied.

Referring to FIG. 21, in operation 2102, the framework may sense station entry of a mobile device, via OOB (e.g., a BLE advertisement message, etc.).

In operation 2104, the framework may identify an applet selection condition, such as a distance between a gate and the mobile device. In an embodiment, the distance between the gate and the mobile device may be estimated based on at least one of DL-TDoA, a GPS, and an RSSI.

In operation 2106, the framework may transmit an applet selection request to a UWB component when the applet selection condition is satisfied (e.g., when the distance between the gate and the mobile device is within 50 cm, etc.). In an embodiment, the applet selection request may include an applet ID to be selected, and the UWB component may perform applet selection based on the applet ID included in the applet selection request.

In operation 2108, the framework may identify a gate access condition based on a distance between a gate and the mobile device, etc. In an embodiment, the distance between the gate and the mobile device may be estimated based on at least one of DL-TDoA, a GPS, and an RSSI.

In operation 2110, the framework may transmit the gate access initiation to the UWB component when the gate access condition is satisfied (e.g., when the distance between the gate and the mobile device is within 30 cm). In an embodiment, the gate access initiation may be transmitted to trigger communication with the gate, and may include identification information for the gate (e.g., a gate address and/or a gate ID, etc.).

Hereinafter, the gate which performs UWB communication according to various embodiments of the disclosure will be described.

Figure 22:
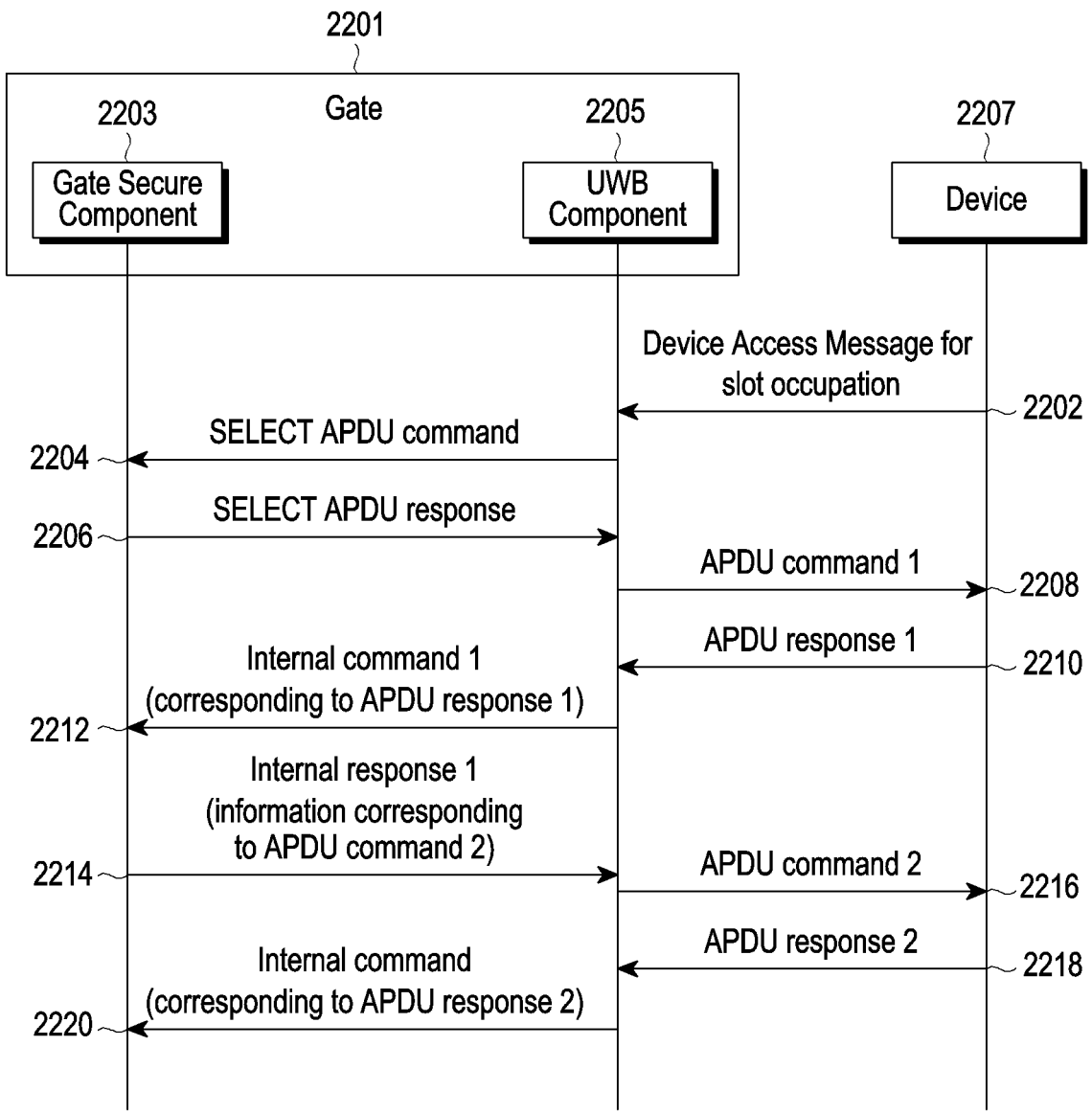
FIG. 22 is a signal flowchart illustrating UWB communication operations of a gate and a mobile device according to various embodiments of the disclosure.

FIG. 22 is a signal flowchart illustrating UWB communication operations of a gate and a mobile device according to various embodiments of the disclosure.

A gate 2201 according to various embodiments of the disclosure may include, like a mobile device 2207, a gate secure component 2203 and a UWB component 2205.

Referring to FIG. 22, in operation 2202, the UWB component 2205 may receive a device access message for slot occupation from the mobile device 2207. In an embodiment, since the mobile device 2207 may perform applet selection on its own, the UWB component 2205 may neither transmit a SELECT command for applet selection to the mobile device 2207 nor receive a SELECT response.

The UWB component 2205 may allocate a slot for UWB communication to the mobile device 2207 in response to the received device access message. If slot allocation to the mobile device 2207 is successfully performed, the UWB component 2205 may perform operation 2204 and subsequent operations below.

In operation 2204, the UWB component 2205 may transmit a SELECT APDU command to the gate secure component 2203. In an embodiment, the SELECT APDU command may be transmitted to select an applet (e.g., an applet included in the gate secure component 2203) for communication with the mobile device 2207.

In operation 2206, the gate secure component 2203 may activate the applet indicated by the SELECT APDU command and transmit a SELECT APDU response to the UWB component 2205.

In operation 2208, the UWB component 2205 may transmit APDU command 1 to the mobile device 2207. In an embodiment, APDU command 1 may be a command to initiate UWB communication.

In operation 2210, the UWB component 2205 may receive APDU response 1 from the mobile device 2207.

In operation 2212, the UWB component 2205 may transmit internal command 1 (corresponding to APDU response 1) to the gate secure component 2203. In an embodiment, operations 2212 to 2220 may show data transmission and reception between the mobile device 2207 and the applet included in the gate secure component 2203.

In operation 2214, the gate secure component 2203 may transmit internal response 1 (information corresponding to APDU command 2) to the UWB component 2205 in response to internal command 1.

In operation 2216, the UWB component 2205 may transmit APDU command 2 based on internal response 1 to the mobile device 2207.

In operation 2218, the mobile device 2207 may transmit APDU response 2 to the UWB component 2205 in response to APDU command 2.

In operation 2220, the UWB component 2205 may transmit an internal command (corresponding to APDU response 2) to the gate secure component 2203.

According to an embodiment, additional APDU command/response transmission and reception may be performed between the mobile device 2207 and the gate 2201.

Figure 23:
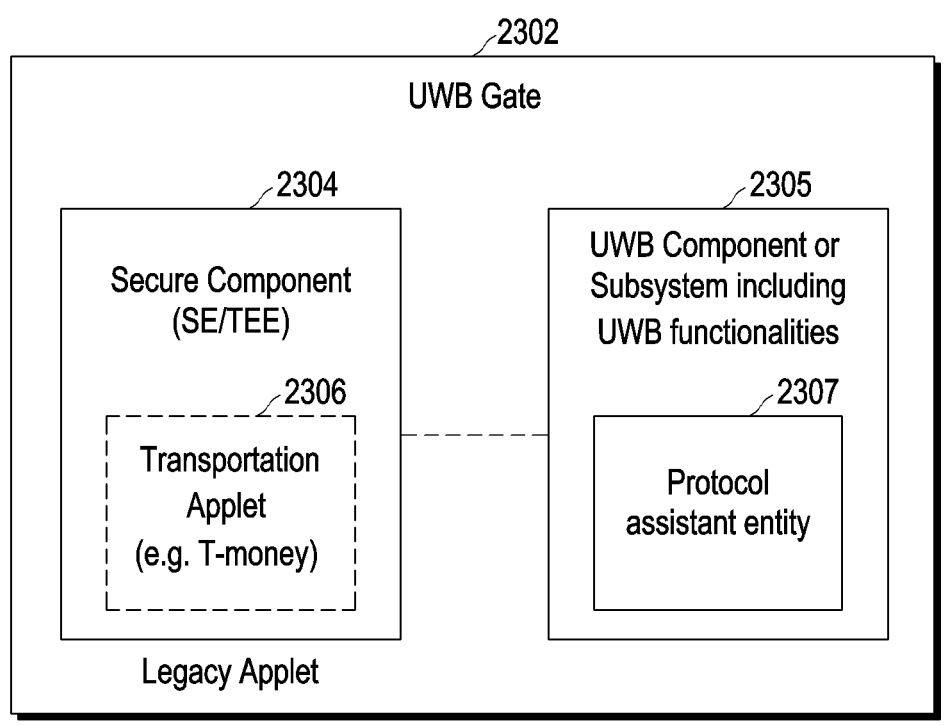
FIG. 23 is a diagram illustrating an exemplary configuration of a UWB gate according to various embodiments of the disclosure.

FIG. 23 is a diagram illustrating an exemplary configuration of a UWB gate according to various embodiments of the disclosure.

Referring to FIG. 23, a UWB gate 2302 may include a secure component (SE/TEE) 2304 and a UWB component (or a subsystem including a UWB function) 2305.

The secure component 2304 may include, for example, a transportation applet 2306 (e.g., T-money). An applet that the secure component 2304 may include is not limited to the transportation applet 2306, and may be any other applet.

The UWB component 2305 may include a protocol assistant entity 2307 which performs an operation for applet selection. In an embodiment, the protocol assistant entity 2307 may include generating a SELECT APDU command/response, transmitting the SELECT APDU command to the transportation applet 2306, and receiving the SELECT APDU response from the transportation applet 2306.

When applet selection is completed, the UWB component 2305 may perform the following operations for data exchange with a mobile device. In an embodiment, the UWB component 2305 may transmit an internal command to the secure component 2304 and receive an internal response from the secure component 2304. The UWB component 2305 may generate an APDU command based on the received internal response, and transmit the generated APDU command to the mobile device. The UWB component 2305 may receive an APDU response transmitted from the mobile device in response to the transmitted APDU command.

The UWB component 2305 may generate an internal command based on the received APDU response, and transmit the generated internal command to the secure component 2304. In addition, the UWB component 2305 may receive an internal response from the secure component 2304 in response to the internal command transmitted to the secure component 2304.

Hereinafter, with reference to FIG. 24, an operation of the UWB component 2305 will be described in detail.

Figure 24:
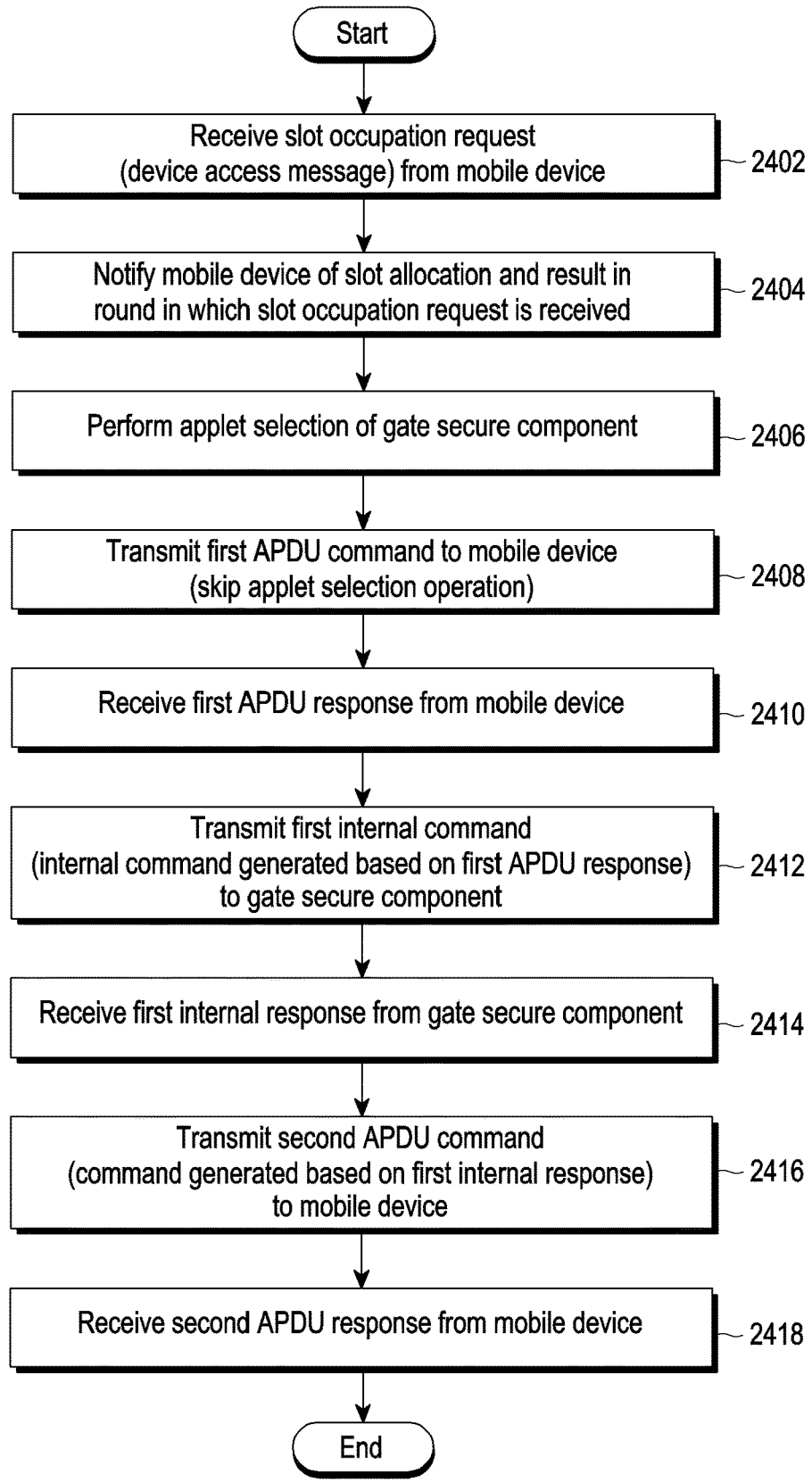
FIG. 24 is a flowchart illustrating a UWB component operation of a gate according to various embodiments of the disclosure.

FIG. 24 is a flowchart illustrating a UWB component operation of a gate according to various embodiments of the disclosure.

Referring to FIG. 24, in operation 2402, the UWB component 2305 may receive a slot occupation request from the mobile device 2207. In an embodiment, the slot occupation request may be received from the mobile device 2207 via a device access message.

In operation 2404, the UWB component 2305 may notify the mobile device 2207 of slot allocation and a result in a round in which the slot occupation request is received.

In operation 2406, the UWB component 2305 may perform applet selection of the gate secure component 2203. In an embodiment, the applet selection may include transmitting, by the UWB component 2305, a SELECT APDU command to the gate secure component 2203 in order to select an applet included in the gate secure component 2203, and receiving a SELECT APDU response as a response to the SELECT APDU command from the gate secure component 2203.

In operation 2408, the UWB component 2305 may transmit a first APDU command to the mobile device 2207. According to an embodiment, unlike before, the UWB component 2305 may skip applet selection for the mobile device 2207, and transmit the first APDU command to the mobile device 2207.

In operation 2410, the UWB component 2305 may receive a first APDU response from the mobile device 2207 in response to the first APDU command.

In operation 2412, the UWB component 2305 may generate a first internal command as an internal command based on the first APDU response, and transmit the generated first internal command to the gate secure component 2203.

In operation 2414, the UWB component 2305 may receive a first internal response from the gate secure component 2203 in response to the first internal command.

In operation 2416, the UWB component 2305 may generate a second APDU command as a command based on the first internal response, and transmit the second APDU command to the mobile device 2207.

In operation 2418, the UWB component 2305 may receive a second APDU response from the mobile device. In an embodiment, the UWB component 2305 may generate a second internal command as an internal command based on the second APDU response, and transmit the generated second internal command to the gate secure component 2203.

Additionally, the UWB component 2305 may repeatedly perform operation 2412 and subsequent operations below.

Figure 25:
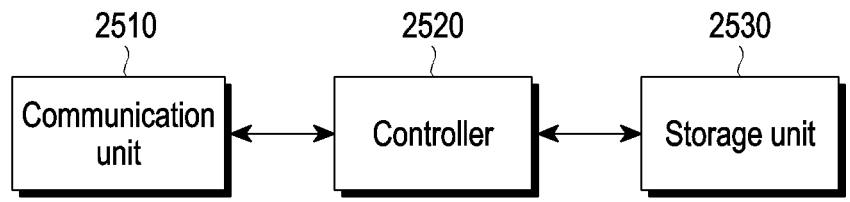
FIG. 25 is a diagram illustrating a structure of a first electronic device according to various embodiments of the disclosure.

FIG. 25 is a diagram illustrating a structure of a first electronic device according to various embodiments of the disclosure.

In an embodiment of FIG. 25, a first electronic device may be an electronic device which corresponds to a UWB device, includes a UWB device, or includes a part of a UWB device. In an embodiment, the first electronic device may be a gate.

Referring to FIG. 25, the first electronic device may include a communication unit 2510, a controller 2520, and a storage unit 2530. In various embodiments of the disclosure, the controller may be defined to be a circuit, an application-specific integrated circuit, or at least one processor.

The communication unit 2510 may transmit a signal to or receive a signal from another entity. The communication unit 2510 may, for example, perform data transmission and reception for UWB communication (e.g., APDU command/response transmission and reception).

The controller 2520 may control overall operations of the first electronic device according to various embodiments of the disclosure. For example, the controller 2520 may control signal flows between respective blocks to perform operations according to the flowcharts and signal flowcharts described above. Specifically, the controller 2520 may control the operations of the gate (or UWB gate) described with reference to, for example, FIG. 5 to FIG. 8, FIG. 12, FIG. 14, and FIG. 22 to FIG. 24.

The storage unit 2530 may store at least one of information transmitted and received via the communication unit 2510 and information generated via the controller 2520. For example, the storage unit 2530 may store information necessary for slot allocation and transmission/reception data.

Figure 26:
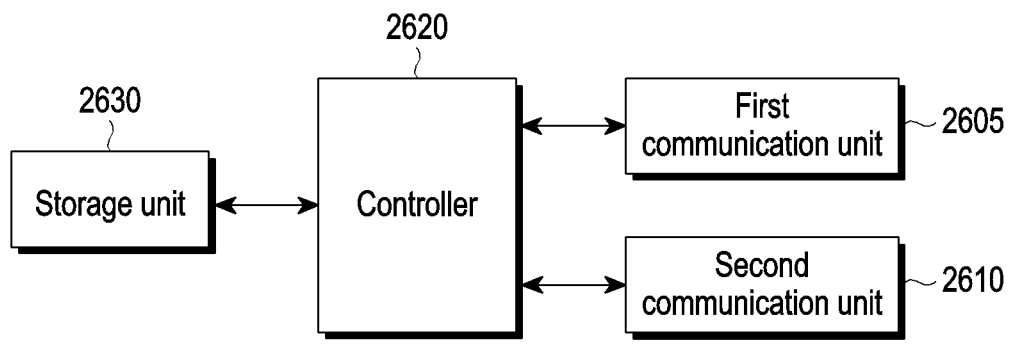
FIG. 26 is a diagram illustrating a structure of a second electronic device according to various embodiments of the disclosure.

FIG. 26 is a diagram illustrating a structure of a second electronic device according to various embodiments of the disclosure.

In an embodiment of FIG. 26, a second electronic device may be an electronic device which corresponds to a UWB device, includes a UWB device, or includes a part of a UWB device. In an embodiment, the electronic device may be a mobile device.

Referring to FIG. 26, the second electronic device may include an OOB communication unit 2605, a UWB communication unit 2610, a controller 2620, and a storage unit 2630. In various embodiments of the disclosure, the controller may be defined to be a circuit, an application-specific integrated circuit, or at least one processor.

The first communication unit 2605 may receive an advertisement message for identification of an entry location of the second electronic device via communication, e.g., Bluetooth communication, other than UWB.

The second communication unit 2610 may transmit a signal to or receive a signal from another entity. The second communication unit 2610 may, for example, perform data transmission and reception for UWB communication (e.g., APDU command/response transmission and reception).

The controller 2620 may control overall operations of the second electronic device according to various embodiments of the disclosure. For example, the controller 2620 may control signal flows between respective blocks to perform operations according to the flowcharts and signal flowcharts described above. Specifically, the controller 2620 may control, for example, the operations of the mobile device described with reference to FIG. 5 to FIG. 22.

The storage unit 2630 may store at least one of information transmitted and received via the first communication unit 2605 and the second communication unit 2610, and information generated via the controller 2620. For example, the storage unit 2630 may store information acquired via a Bluetooth advertisement message, information necessary for applet selection, and transmission/reception data.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method of a first electronic device for performing ultra-wideband (UWB) communication, the method comprising:
   determining a location of the first electronic device via an out-of-band (OOB) connection;
   selecting an applet in the first electronic device, based on information on the determined location; and
   performing UWB communication with a second electronic device adjacent to the determined location by using the selected applet,
   wherein the performing of UWB communication with the second electronic device comprises:
      requesting slot allocation for the UWB communication to the second electronic device,
      in response to the request, receiving allocation of a slot for the UWB communication from the second electronic device, and
      performing the UWB communication in the allocated slot.

2. The method of claim 1, wherein the determining of the location of the first electronic device via the OOB connection comprises:
   receiving a Bluetooth advertisement message; and
   determining the location of the first electronic device, based on location information included in the received Bluetooth advertisement message.

3. The method of claim 2, wherein the first electronic device is a mobile device, the second device is a gate within a station, and the location information included in the received Bluetooth advertisement message comprises identifier (ID) information of the station.

4. The method of claim 1, wherein the information on the determined location is acquired from an application included in the first electronic device, based on the determined location.

5. The method of claim 4, wherein the information on the determined location comprises at least one of identifier (ID) information of the second electronic device, address information of the second electronic device, condition information for accessing the second electronic device, condition information for selecting the applet, information of a UWB anchor adjacent to the determined location, and UWB block structure information.

6. The method of claim 5,
   wherein the condition information for accessing the second electronic device comprises condition information related to a distance between the first electronic device and the second electronic device, and
   wherein the distance between the first electronic device and the second electronic device is estimated based on at least one of downlink-time difference of arrival (DL-TDoA), a global positioning system (GPS), and a receiver signal strength indicator (RSSI).

7. A first electronic device comprising:
a first communication unit configured to perform ultra-wideband (UWB) communication;
a second communication unit configured to perform out-of-band (OOB) connection; and
a controller configured to determine a location of the first electronic device via the OOB connection, select an applet in the first electronic device, based on information on the determined location, and perform, through the first communication unit, the UWB communication with a second electronic device adjacent to the determined location by using the selected applet,
wherein to perform the UWB communication with a second electronic device, the controller is configured to:
request slot allocation for the UWB communication to the second electronic device,
in response to the request, receive allocation of a slot for the UWB communication from the second electronic device, and
perform the UWB communication in the allocated slot.

8. The first electronic device of claim 7, wherein the controller is configured to control the second communication unit to receive a Bluetooth advertisement message, and determine the location of the first electronic device, based on location information included in the received Bluetooth advertisement message.

9. The first electronic device of claim 8, wherein the first electronic device is a mobile device, the second device is a gate within a station, and the location information included in the received Bluetooth advertisement message comprises identifier (ID) information of the station.

10. The first electronic device of claim 7, wherein the information on the determined location is acquired from an application included in the first electronic device, based on the determined location.

11. The first electronic device of claim 10, wherein the information on the determined location comprises at least one of identifier (ID) information of the second electronic device, address information of the second electronic device, condition information for accessing the second electronic device, condition information for selecting the applet, information of a UWB anchor adjacent to the determined location, and UWB block structure information.

12. The first electronic device of claim 11,
wherein the condition information for accessing the second electronic device comprises condition information related to a distance between the first electronic device and the second electronic device, and
wherein the distance between the first electronic device and the second electronic device is estimated based on at least one of downlink-time difference of arrival (DL-TDoA), a global positioning system (GPS), and a receiver signal strength indicator (RSSI).

* * * * *